(12) United States Patent
Barfuss et al.

(10) Patent No.: US 10,075,999 B2
(45) Date of Patent: Sep. 11, 2018

(54) CONDUCTIVE HEATER HAVING SENSING CAPABILITIES

(71) Applicant: GENTHERM GMBH, Odelzhausen (DE)

(72) Inventors: Jack Barfuss, Windsor (CA); Grzegorz Kawa, Windsor (CA); Syed Rafat Iqbal, LaSalle (CA); Bruno Orlando, Windsor (CA); Vincent Libbrecht, Windsor (CA)

(73) Assignee: Gentherm GmbH, Odelzhausen (DE)

( * ) Notice: Subject to any disclaimer, the term of this patent is extended or adjusted under 35 U.S.C. 154(b) by 142 days.

(21) Appl. No.: 15/010,442

(22) Filed: Jan. 29, 2016

(65) Prior Publication Data

US 2016/0150593 A1    May 26, 2016

Related U.S. Application Data

(63) Continuation of application No. 14/275,999, filed on May 13, 2014, now Pat. No. 9,266,454.

(Continued)

(51) Int. Cl.
*B60L 1/02* (2006.01)
*H05B 1/02* (2006.01)
(Continued)

(52) U.S. Cl.
CPC .......... *H05B 1/0236* (2013.01); *B60N 2/002* (2013.01); *B60N 2/5678* (2013.01); *B60N 2/5685* (2013.01); *B62D 1/046* (2013.01);
*B62D 1/065* (2013.01); *H05B 1/02* (2013.01); *H05B 3/34* (2013.01); *H05B 2214/04* (2013.01)

(58) Field of Classification Search
CPC .... G01G 19/4142; H05B 1/0238; H05B 3/34; H05B 2214/04; H05B 2203/005; H05B 2203/017; H05B 2203/029; H05B 2203/003; H05B 2203/014; H05B 1/02;
(Continued)

(56) References Cited

U.S. PATENT DOCUMENTS 3,740,567 A    6/1973  Atkins
3,764,861 A   10/1973  Orris
(Continued)

FOREIGN PATENT DOCUMENTS

DE         4338285 A1    5/1995
DE    102006017732 A1   10/2007
(Continued)

OTHER PUBLICATIONS

Office Action from the Korean Intellectual Property Office for Application No. 10-2015-7029609, dated Feb. 11, 2017.
(Continued)

*Primary Examiner* — Shawntina Fuqua

(57) ABSTRACT

A combination heater and sensor comprising: (a) a heating layer, a sensing layer, or both; (b) one or more power application portions, one or more sensing application portions, or both; wherein the heating layer and the sensing layer are located within the same plane; and wherein the heating layer is a nonwoven layer that is comprised of a plurality of metallized fibers that are randomly oriented forming the heating layer so that upon application of power the heating layer provides heat.

17 Claims, 7 Drawing Sheets

Related U.S. Application Data

(60) Provisional application No. 61/823,642, filed on May 15, 2013.

(51) Int. Cl.
    *B60N 2/00*           (2006.01)
    *B60N 2/56*           (2006.01)
    *H05B 3/34*          (2006.01)
    *B62D 1/04*           (2006.01)
    *B62D 1/06*           (2006.01)

(58) Field of Classification Search
    CPC .. H05B 1/0236; H05B 1/0202; H05B 3/0042; B60N 2/002; B60N 2/5685; B60N 2/5678
    See application file for complete search history.

(56) References Cited

U.S. PATENT DOCUMENTS

| | | |
|---|---|---|
| 4,796,013 A | 1/1989 | Tomi et al. |
| 5,006,421 A | 4/1991 | Yang et al. |
| 5,446,391 A | 8/1995 | Kouji et al. |
| 5,482,314 A | 1/1996 | Corrado et al. |
| 5,722,686 A | 3/1998 | Blackburn et al. |
| 5,824,996 A | 10/1998 | Kochman et al. |
| 5,844,486 A | 12/1998 | Kithil et al. |
| 5,890,085 A | 3/1999 | Corrado et al. |
| 5,935,474 A | 8/1999 | Grischenkov et al. |
| 6,057,530 A | 5/2000 | Gurevich |
| 6,093,908 A | 7/2000 | Haag |
| 6,094,610 A | 7/2000 | Steffens et al. |
| 6,135,494 A | 10/2000 | Lotito et al. |
| 6,150,642 A | 11/2000 | Weiss et al. |
| 6,158,768 A | 12/2000 | Steffens et al. |
| 6,172,344 B1 | 1/2001 | Gordon et al. |
| 6,179,378 B1 | 1/2001 | Baumgartner et al. |
| 6,218,947 B1 | 4/2001 | Sutherland |
| 6,220,627 B1 | 4/2001 | Stanley |
| 6,270,114 B2 | 8/2001 | Mai et al. |
| 6,272,411 B1 | 8/2001 | Corrado |
| 6,275,146 B1 | 8/2001 | Kithil et al. |
| 6,292,727 B1 | 9/2001 | Norton |
| 6,294,758 B1 | 9/2001 | Masao et al. |
| 6,378,900 B1 | 4/2002 | Stanley et al. |
| 6,392,542 B1 | 5/2002 | Stanley |
| 6,499,359 B1 | 12/2002 | Washeleski et al. |
| 6,512,202 B2 | 1/2003 | Haag et al. |
| 6,517,106 B1 | 2/2003 | Stanley et al. |
| 6,520,535 B1 | 2/2003 | Stanley et al. |
| 6,538,405 B1 | 3/2003 | Brzozowkski et al. |
| 6,552,550 B2 | 4/2003 | Karray et al. |
| 6,577,023 B1 | 6/2003 | Stanley et al. |
| 6,577,142 B2 | 6/2003 | Eisenmann et al. |
| 6,584,387 B1 | 6/2003 | Norton |
| 6,682,095 B2 | 1/2004 | Roychoudhury et al. |
| 6,693,440 B2 | 2/2004 | Basir et al. |
| 6,693,442 B2 | 2/2004 | Karray et al. |
| 6,696,948 B2 | 2/2004 | Thompson et al. |
| 6,703,845 B2 | 3/2004 | Stanley et al. |
| 6,782,759 B2 | 8/2004 | Shank et al. |
| 6,812,431 B2 | 11/2004 | Morinet et al. |
| 6,814,889 B1 | 11/2004 | O'Grady et al. |
| 6,816,077 B1 | 11/2004 | Shieh et al. |
| 6,825,765 B2 | 11/2004 | Stanley et al. |
| 6,831,565 B2 | 12/2004 | Wanami et al. |
| 6,906,293 B2 | 1/2005 | Schmiz et al. |
| 6,927,678 B2 | 8/2005 | Fultz et al. |
| 6,968,263 B1 | 11/2005 | Norton |
| 6,968,746 B2 | 11/2005 | Shank et al. |
| 6,974,935 B2 | 12/2005 | O'Grady |
| 7,106,206 B2 | 3/2006 | Grey |
| 7,053,344 B1 | 5/2006 | Surjan et al. |
| 7,065,438 B2 | 6/2006 | Thompson et al. |
| 7,083,227 B2 | 8/2006 | Brennan et al. |
| 7,084,763 B2 | 8/2006 | Shieh et al. |
| 7,088,113 B2 | 8/2006 | Basir et al. |
| 7,098,674 B2 | 8/2006 | Stanley et al. |
| 7,102,527 B2 | 9/2006 | Shieh et al. |
| 7,132,642 B2 | 11/2006 | Shank et al. |
| 7,134,715 B1 | 11/2006 | Fristedt et al. |
| 7,135,983 B2 | 11/2006 | Filippov et al. |
| 7,151,452 B2 | 12/2006 | Shieh |
| 7,180,306 B2 | 2/2007 | Stanley et al. |
| 7,190,277 B2 | 3/2007 | Fultz et al. |
| 7,191,044 B2 | 3/2007 | Thompson et al. |
| 7,217,891 B2 | 5/2007 | Fischer et al. |
| 7,285,748 B2 | 10/2007 | Nelson et al. |
| 7,293,467 B2 | 11/2007 | Shank et al. |
| 7,306,283 B2 | 12/2007 | Howick et al. |
| 7,321,311 B2 | 1/2008 | Rieth et al. |
| 7,362,225 B2 | 4/2008 | Rittmueller et al. |
| 7,436,299 B2 | 10/2008 | Shieh et al. |
| 7,436,315 B2 | 10/2008 | Kamizono et al. |
| 7,500,536 B2 | 3/2009 | Bulgajewski et al. |
| 7,513,166 B2 | 4/2009 | Shank et al. |
| 7,521,940 B2 * | 4/2009 | Koch ............... B60N 2/002 324/661 |
| 7,542,836 B1 | 6/2009 | Norton |
| 7,614,314 B2 | 11/2009 | Park et al. |
| 7,656,169 B2 | 2/2010 | Schckenbach et al. |
| 7,663,076 B2 | 2/2010 | Tarry |
| 7,663,378 B2 | 2/2010 | Ito et al. |
| 7,679,378 B2 | 3/2010 | Hawes et al. |
| 7,688,204 B2 | 3/2010 | Yamanaka et al. |
| 7,735,932 B2 | 6/2010 | Lazanja et al. |
| 7,741,582 B2 | 6/2010 | Howich et al. |
| 7,830,246 B2 | 11/2010 | Hawkins |
| 7,838,804 B2 * | 11/2010 | Krobok ............... H05B 3/34 165/158 |
| 7,859,423 B2 | 12/2010 | Yamanaka et al. |
| 7,876,106 B2 | 1/2011 | Hansen et al. |
| 7,880,480 B2 | 2/2011 | Hansen |
| 7,880,481 B2 | 2/2011 | Zangl et al. |
| 7,908,927 B2 | 3/2011 | Washeleski et al. |
| 7,928,341 B2 | 4/2011 | Ito et al. |
| 7,962,311 B2 | 6/2011 | Launay et al. |
| 7,987,033 B2 | 7/2011 | Launay et al. |
| 8,011,234 B2 | 9/2011 | Kandler |
| 8,033,182 B2 | 10/2011 | Launay et al. |
| 8,041,482 B2 | 10/2011 | Federspiel et al. |
| 8,049,520 B2 | 11/2011 | Schleech |
| 8,091,960 B2 | 1/2012 | Kincaid et al. |
| 8,118,362 B2 | 2/2012 | Nishimura et al. |
| 8,120,483 B2 | 2/2012 | Ootaka et al. |
| 8,138,772 B2 | 3/2012 | McDonnell et al. |
| 8,143,907 B2 | 3/2012 | Yamanaka et al. |
| 8,154,394 B2 | 4/2012 | Hansen |
| 8,184,013 B2 | 5/2012 | Hammerschmidt |
| 8,193,820 B2 | 6/2012 | Nakagawa et al. |
| 8,198,569 B2 | 6/2012 | Krobok et al. |
| 8,223,016 B2 | 7/2012 | Nakagawa et al. |
| 8,237,455 B2 | 8/2012 | Griffin |
| 8,269,512 B2 | 9/2012 | Ootaka |
| 8,285,454 B2 | 10/2012 | Norton |
| 8,294,478 B2 | 10/2012 | Yamanaka et al. |
| 8,305,092 B2 | 11/2012 | Tabaczynski |
| 8,335,617 B2 | 12/2012 | Satake et al. |
| 8,354,936 B2 | 1/2013 | Ootaka |
| 8,378,819 B2 | 2/2013 | Ootaka |
| 8,400,323 B2 | 3/2013 | Fischer et al. |
| 8,405,408 B2 | 3/2013 | Ootaka |
| 8,448,521 B2 | 3/2013 | Washeleski et al. |
| 8,456,180 B2 | 6/2013 | Sotarski |
| 8,493,079 B2 | 6/2013 | Petereit et al. |
| 8,500,194 B2 | 8/2013 | Fischer et al. |
| 8,507,831 B2 | 8/2013 | Howick et al. |
| 8,564,424 B2 | 10/2013 | Evarts et al. |
| 8,581,603 B2 | 11/2013 | Hwang et al. |
| 8,599,004 B2 | 12/2013 | Nakagawa |
| 8,659,303 B2 | 2/2014 | Hayakawa |
| 8,669,492 B2 | 3/2014 | Ito et al. |
| 8,698,511 B2 | 4/2014 | Wendt et al. |
| 8,700,265 B2 | 4/2014 | Stanley et al. |
| 8,704,651 B2 | 4/2014 | Nix et al. |

(56) References Cited

U.S. PATENT DOCUMENTS

| | | | |
|---|---|---|---|
| 8,729,430 B2 | 5/2014 | Lamesch et al. | |
| 8,754,661 B2 | 6/2014 | Satake et al. | |
| 8,766,142 B2 | 7/2014 | Howick et al. | |
| 8,818,637 B2 | 8/2014 | Stanley et al. | |
| 8,882,142 B2 | 11/2014 | Lamesch et al. | |
| 8,957,689 B2 | 2/2015 | Vimich et al. | |
| 8,970,231 B2 | 3/2015 | Kandler | |
| 8,970,232 B2 | 3/2015 | Kandler | |
| 8,994,385 B2 | 3/2015 | Vimich et al. | |
| 9,000,331 B2 | 4/2015 | Vimich et al. | |
| 9,006,618 B2 | 4/2015 | Lamesch et al. | |
| 2001/0001522 A1 | 5/2001 | Mai et al. | |
| 2004/0144197 A1 | 7/2004 | O'Grady | |
| 2005/0077287 A1 | 4/2005 | O'Grady | |
| 2009/0255916 A1 | 10/2009 | Katterman et al. | |
| 2010/0038351 A1 | 2/2010 | Tabaczynski | |
| 2010/0277186 A1 | 11/2010 | Bieck et al. | |
| 2011/0006788 A1 | 1/2011 | Kim et al. | |
| 2011/0148648 A1 | 6/2011 | Fischer et al. | |
| 2011/0163764 A1 | 7/2011 | Shank et al. | |
| 2011/0163765 A1 | 7/2011 | Gray et al. | |
| 2011/0163767 A1 | 7/2011 | Chen et al. | |
| 2011/0163878 A1 | 7/2011 | Gray et al. | |
| 2011/0226751 A1* | 9/2011 | Lazanja | B60N 2/5685 219/217 |
| 2011/0260435 A1 | 10/2011 | Hsu et al. | |
| 2011/0285408 A1 | 11/2011 | Satake et al. | |
| 2011/0290775 A1 | 12/2011 | Cubon et al. | |
| 2011/0307148 A1 | 12/2011 | Griffin et al. | |
| 2012/0001463 A1 | 1/2012 | Breed et al. | |
| 2012/0161953 A1 | 6/2012 | Nakagawa | |
| 2013/0020305 A1 | 1/2013 | Lamesch et al. | |
| 2013/0069673 A1 | 3/2013 | Vimich et al. | |
| 2013/0098890 A1 | 4/2013 | Vimich et al. | |
| 2013/0113239 A1 | 5/2013 | Akaike et al. | |
| 2013/0127211 A1* | 5/2013 | Aoki | B60N 2/002 297/180.12 |
| 2013/0127212 A1 | 5/2013 | Aoki | |
| 2013/0134745 A1 | 5/2013 | Aoki | |
| 2013/0147238 A1 | 6/2013 | Thinnes | |
| 2013/0186884 A1 | 7/2013 | Barfuss et al. | |
| 2013/0213950 A1 | 8/2013 | Bulgajewski et al. | |
| 2013/0263672 A1 | 10/2013 | Washeleski et al. | |
| 2013/0270874 A1 | 10/2013 | Lamesch | |
| 2013/0277351 A1 | 10/2013 | Lamesch | |
| 2013/0328577 A1 | 12/2013 | Satake et al. | |
| 2013/0334196 A1 | 12/2013 | Lamesch | |
| 2014/0043047 A1 | 2/2014 | Fischer et al. | |
| 2014/0097651 A1 | 4/2014 | Fortune et al. | |
| 2014/0125355 A1 | 5/2014 | Grant | |
| 2014/0131344 A1 | 5/2014 | Lamesch | |
| 2014/0132042 A1 | 5/2014 | Midderhoff et al. | |
| 2014/0151356 A1 | 6/2014 | Maguire et al. | |
| 2014/0197942 A1 | 7/2014 | Tabaczynski et al. | |
| 2014/0239980 A1 | 8/2014 | Ootaka | |
| 2014/0253151 A1 | 9/2014 | Kandler et al. | |
| 2014/0285223 A1 | 9/2014 | Inoue | |
| 2014/0299591 A1 | 10/2014 | Howick et al. | |
| 2014/0326709 A1 | 11/2014 | Chabach et al. | |
| 2014/0339211 A1 | 11/2014 | Barfuss et al. | |
| 2015/0048845 A1 | 2/2015 | Petereit et al. | |
| 2015/0054317 A1 | 2/2015 | Fortune et al. | |
| 2015/0102024 A1 | 4/2015 | Barfuss et al. | |
| 2016/0021705 A1 | 1/2016 | Barfuss et al. | |

FOREIGN PATENT DOCUMENTS

| | | |
|---|---|---|
| DE | 102008050669 A1 | 4/2010 |
| EP | 2028078 A1 | 2/2009 |
| EP | 1645166 B1 | 7/2009 |
| EP | 1127356 B1 | 8/2011 |
| EP | 2572929 A1 | 3/2013 |
| JP | 2002-526901 | 8/2002 |
| JP | 2005-071757 | 3/2005 |
| JP | 2007-122893 | 5/2007 |
| JP | 2008-024087 | 7/2008 |
| WO | 2005/036930 A1 | 4/2005 |
| WO | 2005/093158 A1 | 10/2005 |
| WO | 2010/065411 A1 | 6/2010 |
| WO | 2011/079092 A1 | 6/2011 |
| WO | 2012/038325 A1 | 3/2012 |
| WO | 2012/038326 A1 | 3/2012 |
| WO | 2012/113833 A1 | 8/2012 |
| WO | 2013/050621 A2 | 4/2013 |

OTHER PUBLICATIONS

The State Intellectual Property Office of P.R. China first Office Action dated May 4, 2016 for Application No. 201480021608.

The State Intellectual Property Office of P.R. China first Office Action dated Jan. 5, 2017 for Application No. 201480021608.

Japanese Decision of Final Rejection dated Feb. 24, 2017 for Application No. 2016-508283.

Examination Report from the German Patent and Trademark Office for Application No. 112014002044.3, dated Apr. 28, 2016.

Potentially related U.S. Appl. No. 14/509,744, filed Oct. 8, 2014, published Apr. 16, 2015, as 2015/0102024.

Potentially related U.S. Appl. No. 14/333,975, filed Jul. 17, 2014, published Jan. 21, 2016, as 2016/0021705.

International Search Report and Written Opinion, Application No. PCT/IB2014/061411, dated Sep. 19, 2014.

Japanese Office Action dated Aug. 19, 2016; Application No. JP2016-508283.

* cited by examiner

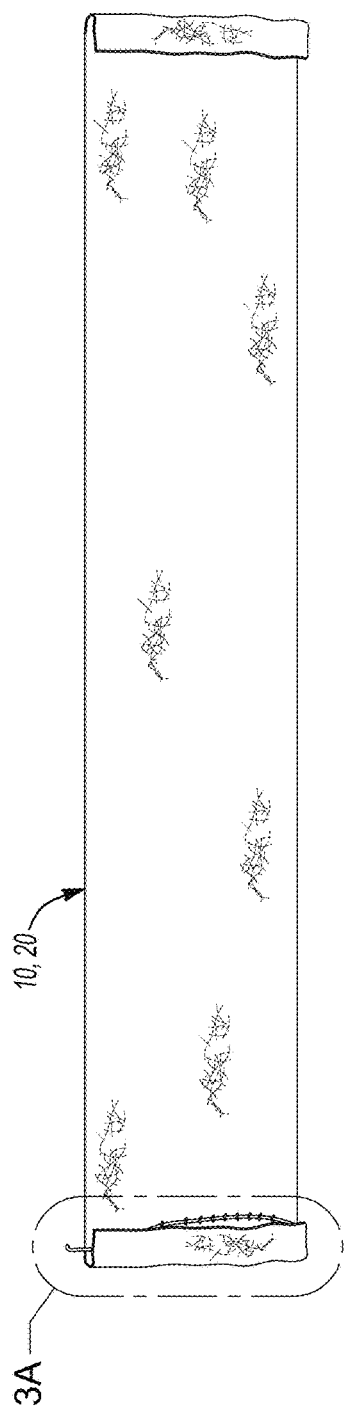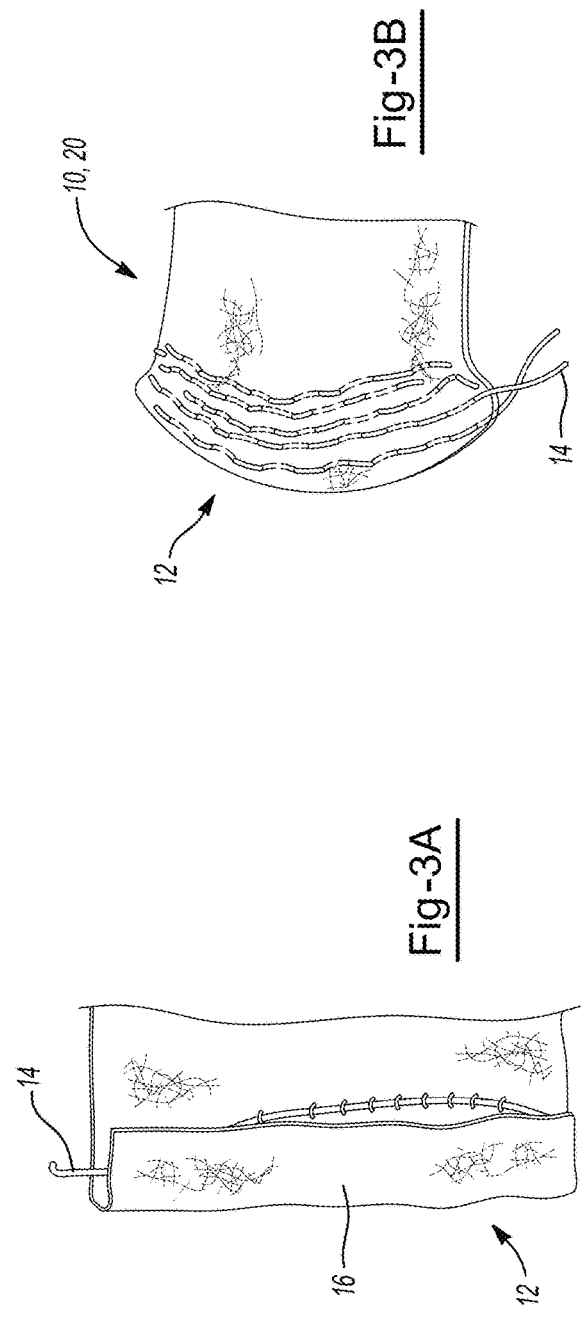

CONDUCTIVE HEATER HAVING SENSING CAPABILITIES

FIELD

The present teachings generally relate to a device including both heating capabilities and sensing capabilities so that all or a portion of an occupant is sensed and heated.

BACKGROUND

The present teachings are predicated upon providing an improved heater and more preferably an improved heater for use in a vehicle. Generally, heaters include a wire that is formed in a pattern. The wire produces heat when electricity is applied to the wire. The wire may also be placed in a carbonaceous material so that as the wire heats up the heat is diffused into the carbonaceous material heating a larger area. However, achieving uniform heating in these devices may not always be achieved and hot spots may occur around the heating wires. Further, if a heating wire breaks the heater may cease to heat. Heaters may also include electrodes that are connected by a positive temperature coefficient material so that electricity is conducted from one electrode through the positive coefficient material to the other electrode and heat is produced. Other heaters have a woven configuration where a plurality of long materials are woven together to form a heater. These heaters may result in hot spots along one or more of the materials as these materials may allow for current drift along one wire.

In addition to heaters, sensors may be installed within a vehicle component. These sensors may be an occupant sensor that determines the presence of an occupant within a vehicle seat, the weight of the occupant, the size of the occupant, or a combination thereof so that, for example, an air bag may be turned on or off based upon sensed characteristics. Typically, when a heater and an occupant sensor are used, two discrete components are installed within a component so that one produces heat and the other senses. Having two discrete devices adds to the complexity of the system, increases installation expenses, increases the number of components that may fail, increases packing space, may cause electrical interference between the two devices, or a combination thereof. Therefore, it is desirable to have a combination heater that includes sensing capabilities so that the heater both heats and senses the presence of an occupant, the position of an occupant, or both.

Examples of heaters may be found in U.S. Pat. Nos. 5,824,996; 5,935,474; 6,057,530; 6,150,642; 6,172,344; 6,294,758; 7,053,344; 7,285,748; and 7,838,804; all of which are incorporated by reference herein for all purposes. Examples of combination sensors and heaters may be found in U.S. Pat. Nos. 5,006,421 and 7,500,536; and U.S. Patent Application Publication Nos. 2009/0255916; 2011/0290775; and 2013/0020305.

It would be attractive to have a combination heater and sensor that are free of discrete components. It would be attractive to have a heater that acts as a sensor without the addition of any additional sensing elements. What is needed is a flexible heater that provides good heating performance and also can be used as a sensor so that the heater/sensor may be installed in compact spaces, in spaces that require a high degree of flexibility, or both.

SUMMARY

The present teachings meet one or more (if not all) of the present needs by providing an improved device that includes: a combination heater and sensor comprising: (a) a heating layer, a sensing layer, or both; (b) one or more power application portions, one or more sensing application portions, or both; wherein the heating layer and the sensing layer are located within the same plane; and wherein the heating layer is a nonwoven layer that is comprised of a plurality of metallized fibers that are randomly oriented forming the heating layer so that upon application of power the heating layer provides heat.

The teachings herein provide: a sensor comprising: (a) a nonwoven sensing layer having: (i) a plurality of individual fibers that are randomly oriented; and (ii) a plurality of voids and/or pores interspersed between the plurality of individual fibers that are randomly oriented; (b) one or more power application portions connecting the sensing layer to a signal source so that the sensor senses a presence of an occupant, contact with the sensor, or both.

The teachings herein provide: a method comprising: (a) installing a combination heater and sensor into a component of an automobile; (b) providing power to the combination heater and sensor so that a heating layer of the combination heater and sensor produces heat; (c) providing a signal to the combination heater and sensor so that a sensing layer of the combination heater and sensor produces a signal for determining presence of an occupant, contact between the occupant and the component of the automobile, or both; and (d) monitoring the signal for an occupant, lack of an occupant, lack of contact between the component and the occupant, or a combination thereof.

The teachings herein surprisingly solve one or more of these problems by providing a combination heater and sensor that are free of discrete components. The teachings herein provide a heater that acts as a sensor without the addition of any additional sensing elements. The teachings herein provide a flexible heater that provides good heating performance and also can be used as a sensor so that the heater/sensor may be installed compact spaces, in spaces that require a high degree of flexibility, or both.

BRIEF DESCRIPTION OF THE DRAWINGS

FIG. 2 illustrates a heater/sensor of the teachings herein;

FIG. 3A illustrates a close-up view of a power application of FIG. 2;

FIG. 3B illustrates a close-up view of an alternative power application of the teachings herein;

DETAILED DESCRIPTION

Figure 1:
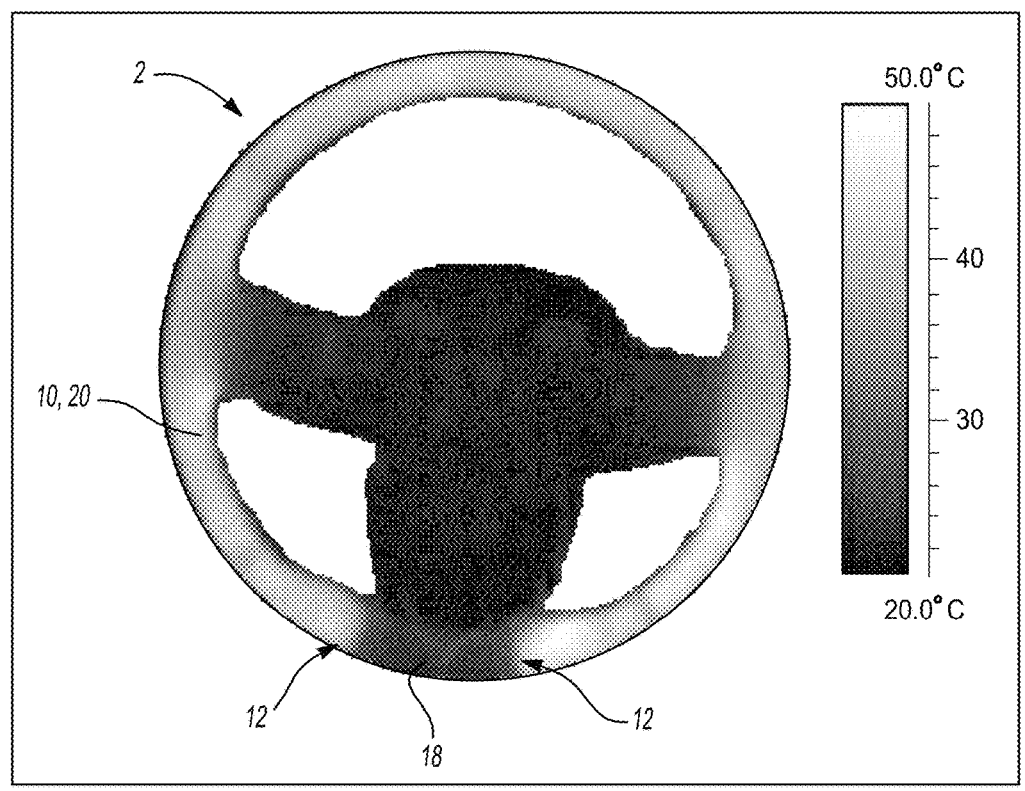
FIG. 1 illustrates an infrared image of a heater of the teachings herein.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings claim priority to U.S. Provisional Application No. 61/823,642, filed on May 15, 2013 the teachings of which are incorporated herein in their entirety for all purposes. The device as taught herein may be useful as a heater and/or incorporated into another device so that the other device may be used as a heater. The device as taught herein may be used for any known heating application. For example, the heater may be used to heat a bed, plants, be a therapeutic heater, vehicle seats, steering wheels, mirrors, glass, flooring, door panels, arm rests, headliners, the like, or a combination thereof. Preferably, the device as taught herein may be connected to, incorporated into a vehicle seat, a steering wheel, or both. The heater as discussed herein may be a discrete piece that is laid over a cushion of a vehicle seat (i.e., bun or back portion) and then a trim cover placed over the heater, around a steering wheel and then covered by a trim piece, or both. A portion of the heater may enter a trench in the cushion so that the heater, the cushion, the trim cover, or a combination thereof are attached to a seat frame. The heater may be shapeable, formable, cuttable, or a combination thereof so that heater may be substantially prevented form heating the trench regions of a vehicle seat. For example, a portion of the heater may be cut out so that substantially only the electrodes, buses, power conductors, or a combination thereof extend into the trench of a vehicle seat. A trim cover may have attachment features that extend through the heater so that the heater is connected to the trim cover and the vehicle component.

One or more heaters may be secured in the vehicle seat and/or steering wheel by a mechanical fastener, an adhesive, pressure from one or more adjacent layers, welding, heat staking, ultrasonic welding, sewing, or a combination thereof. For example, a thread of the same material as the heater may sew the heater to a trim layer, a support, or both so that the heater is secured within the component. The adhesive may be releasably connected to the heater, permanently connected to the heater, a pressure sensitive adhesive, glue, a hook and loop fastener, a spray on adhesive, a peel and stick adhesive, or a combination thereof. The heater may be secured directly to the trim layer, directly to the cushion (i.e., bun, back, or both) of the seat, directly to the steering wheel, or a combination thereof. A mechanical fastener may extend through, connect to, attach on, or a combination thereof the heater so that the heater may be fixed within the seat, within the steering wheel, or both. The mechanical fastener may be a hog ring; a metal bar that extends over a portion of the heater and pulls the heater and the trim layer into close proximity to the cushion; a plastic tag that punches through a portion of the heater, a portion of the trim layer, or both; or a combination thereof. The heater of the teachings herein may be used in conjunction with other devices.

The one or more heaters may be used with one or more sensors (e.g., a contact sensor, a passenger sensor, or both). The heater may be the sensor. The sensor may be sewn into the heater. For example, a conductive thread, wire, conductor, printed electrode, or a combination thereof may be connected to the heater so that when a signal, power, or both are applied a signal is created. The sensor may be any type of passenger sensor that senses the presence of a passenger, contact with the heater, contact proximate to the heater, the size of the occupant, or a combination thereof. The heater, the steering wheel, the vehicle seat, or a combination thereof may be free of a separate sensor. For example, the heater itself may be used as a sensor as is discussed herein. The passenger sensor may be a capacitive sensor, a pressure sensor, a membrane sensor, infrared, passive and/or active ultrasonic sensor, a mass sensor, or a combination thereof. The sensor may be connected to a system that triggers an alarm when the user is not in contact with the steering wheel, turns on an onboard guidance system when the user is not contacting the steering wheel, provides an alarm when a passenger is detected and the passenger is not wearing a seat belt, turns off the air bag when an occupant below a predetermined weight is in the seat, or a combination thereof. The heater and a passenger sensor may be used with an active cooling system, active heating system, a ventilated system, or a combination thereof.

The heater may be used with an active heating, active cooling, ventilation, or a combination thereof. The heater may be porous so that air may pass directly through the heater. The heater may include one or more porous layers that cover the heater so that air passes directly through the heater and the one or more layers that cover the heater (e.g., a fleece layer, an adhesive, a protective covering layer, or a combination thereof). The heater may include one or more barrier layers that fully and/or partially cover the heater so that the barrier layers assist in directing fluid flow to regions of the heater that may be contacted. The barrier layer when present may be formed in any configuration so that air may be directed to specific desired locations. For example, the heater may be substantially porous through a central "U"

shaped portion of the heater and the regions surrounding the "U" shape may include a non-porous or barrier material that may prevent a fluid from passing so that the fluid moved is directed to the contact areas. The heater may include one or more through holes so that air may be moved through the heater. The heater may include and/or be in fluid communication with a fan and/or blower, be adjacent to a blower and/or fan so that the blower and/or fan may move a fluid through and/or around the heater. The heater, the fan, the blower, or a combination thereof may include a peltier device, a thermoelectric device, or both so that hot and/or cooled air (i.e., conditioned air) may be moved towards an occupant. The heater may be indirectly connected to a fan, blower, or both that include a pettier device, a thermoelectric device, or both.

The heater may be connected to an insert (i.e., bag) that assists in distributing conditioned air to an occupant. The heater may have one or more holes that mirror the holes in the insert. The heater may have no holes and the air from the bag may pass directly through the heater in route to an occupant. The heater layer may be connected directly to the insert. All or a portion of the heater layer may be connected to the insert. The insert may be one or more polymeric layers that form a substantially air impermeable layer and/or an air impermeable layer so that air directed into the insert is directed to a predetermined region. The insert may include one or more spacer materials. The heater as taught herein may act as the spacer material and/or part of a spacer layer that forms an open space in the insert. Additional aspects of the insert and its various layers and materials can be gleaned from the teachings herein including those of Column 1, line 45 through Column 3, line 67; Column 4; line 54 though Column 6, line 32 and FIGS. 2-3 of U.S. Pat. No. 7,083,227, and Column 3; line 34 through Column 10; line 2; Column 11, line 4 through Column 13, line 18; and FIGS. 1, 4, 15A and 15B of U.S. Pat. No. 7,735,932 incorporated by reference herein, which shows various alternative embodiments of inserts, insert materials, and insert constructions that may be used with the heater taught herein.

The one or more heater may be formed as a sheet. The heater may be one or more sheets. The heater may be a plurality of sheets that are physically discrete and electrically connected together. Preferably, the heater as taught herein is a nonwoven sheet. For example, the heating layer as taught herein may be comprised of a plurality of individual fibers that optionally may be cut to a predetermined length and randomly oriented to form the heater. The heater may conform to virtually any shape. For example, the heater may be wrapped around a circular object so that the circular object is heated (e.g., a steering wheel). The heater may include a plurality of fibers that form a heating layer. The heating layer may be made up of about 50 percent by weight or more, about 80 percent by weight more, preferably about 70 percent by weight or more, or more preferably about 80 percent by weight or more fibers. The heating layer may be made up of about 82 percent by weight or more, 85 percent by weight or more, about 90 percent by weight or more, about 92 percent by weight or more, or even about 95 percent by weight or more fibers. The heating layer may be made of about 99 percent by weight or less, about 98 percent by weight or less, or about 97 percent by weight or less fibers. The heating layer may include from about 50 percent by weight to 99 percent by weight fibers, preferably from about 70 percent by weight to about 99 percent by weight fibers, and more preferably from about 80 percent by weight to about 99 percent by weight fibers (i.e., from about 80 percent by weight to about 90 percent by weight).

Preferably, the plurality of fibers are randomly distributed throughout the heating layer. More preferably, the plurality of fibers have an average short fiber length so that when combined, the heating layer has a nonwoven structure and the fibers cannot be woven around each other using a mechanical device. Even more preferably, the average fiber length and orientation of the fibers produces a substantially constant heat gradient, a substantially constant heat density, or both across the heater when power is applied. The fiber may be sufficiently randomly oriented so that the orientation of the fibers forces the power to move and spread throughout the heater proving substantially uniform heating, a uniform heat density, or both and the power is free of traveling along one specific line. In an example, the heating layer taught herein is substantially free of fiber orientation so that the heating layer does not have a machine direction, a cross direction, or both. The heating layer may be free of individual heating wires, heating threads, or both and the heating may occur through the randomly oriented fibers. Randomly oriented as discussed herein means than about 60 of the fibers or less, about 50 or less, preferably about 40 percent or less, more preferably about 30 percent or less, or even more preferably about 20 percent or less of the fibers are oriented in the same direction. The average fiber length may affect the orientation of the fibers.

The average fiber length may be any length so that a nonwoven sheet is formed and the sheet has sufficient strength to be bent, folded, cut, conduct power, be pushed into a trench, stretched, or a combination thereof. The average fiber length may be any length so that the fibers have sufficient contact with each other so that when power is applied, power passes from fiber to fiber and the heater produces a substantially even temperature gradient (i.e., the temperature when measured randomly across the heater is within about ±5° C. or less, about +3° C. or less, or about ±2° C. or less). The average fiber length may be about 130 mm or less, about 110 mm or less, about 100 mm or less, about 80 mm or less, about 60 mm or less, about 50 mm or less. Preferably, the average fiber length is relatively short. Thus, the average fiber length may be about 40 mm or less, about 30 mm or less, preferably about 28 mm or less, more preferably about 25 mm or less, or even more preferably about 22 mm or less. The average fiber length may vary from about 50 mm to about 1 mm, preferably from about 40 mm to about 3 mm, more preferably from about 25 mm to about 5 mm. The average fiber length as discussed herein may have a standard deviation of ±5 mm or less, ±4 mm or less, preferably ±3 mm or less, more preferably about ±2 mm or less, or even more preferably about ±1 mm or less, or most preferably about ±0.5 mm or less. The maximum fiber length (i.e., the longest fiber in the heater) may be about 200 mm or less, preferably about 175 mm or less, more preferably about 150 mm or less, even more preferably about 100 mm or less, or most preferably about 50 mm or less.

The heating layer may be made of any nonwoven material that conducts electricity and produces heat. The heating layer may be made of any nonwoven material that may be cut, bent, folded, pierced, or a combination thereof any produce heat when power is applied. The heating layer may be made of a material that may be produced using a spunlace process (e.g., hydroentanglement), a needlepunch process, or a combination of both. The heating layer may include carbon, a metallic coated carbon, a polymer, a metallic coated polymer, a binder, or a combination thereof. Preferably, the heating layer includes a plurality of fibers made of carbon or a polymer, and the fibers being coated with one or more layers of a metallic material. One or more coatings may be applied to the fibers before a layer is formed, one or more coatings may be applied to the fibers when the fibers are a layer (e.g., a fiber mat or fiber sheet), a first coating may be applied to the fibers and then a second coating may be applied to the fibers when they are part of the layer, or a combination thereof. In an example, a nylon mat may be formed and then the nylon mat may be coated with copper and then nickel so that the nickel prevents the copper from corroding and/or oxidizing. Polymers that the fiber may be made of are nylon, a polyester, polyurethane, polyamide, an aramid, a para-aramid, a meta-aramid, vinyl alcohol, thermoplastic urethane, urethane, polyimide, carbon, carbon fiber, or a combination thereof. The fibers may be coated with any material that may conduct electricity.

Metals that may be used to coat the carbon fibers, the polymer fibers, or both are copper, silver, gold, nickel, aluminum, tungsten, zinc, lithium, platinum, tin, titanium, platina 4, or a combination thereof. In one preferred embodiment the plurality of fibers are made of only of carbon. In another preferred embodiment the fibers are made of nylon or carbon and coated with nickel or silver. If a coated fiber is used the coating may be used as a percentage of the total weight of the heating layer. The percentage of total weight of the coating may be any weight so that when power is supplied to the heating layer the heating layer produces heat. Preferably, the percentage of the coating in the total weight of the heating layer may be a sufficient amount so that the heating layer upon an application of power heats up to a temperature from about 80° C. to about 110° C. The percentage of the coating in the total weight of the heating layer may be a sufficient amount so that the resistivity of the heating layer is from about 1Ω to about 5Ω and preferably from about 1.5Ω to about 2.5Ω. The coating may make up about 5 percent or more, about 10 percent or more, or preferably about 15 percent or more of the total weight of the heating layer. The coating may make up about 50 percent or less, about 40 percent or less, or about 30 percent or less of the total weight of the heating layer (i.e., from about 20 percent to about 25 percent of the total weight). An example of one metallized nylon nonwoven fleece is sold with a trade name HNV80 available from YSShield. Some examples of some carbon nonwovens are available under the trade names C10001xxxT Series, NC10004xxxT series, C100040xxT series available from Marktek inc. Another example of a nonwoven is sold under the tradername Nickel Nanostrands, Nickel CVD coated carbon fiber, or Nickel CVD coated nonwoven carbon fiber available from Conductive Composites. The plurality of fibers discussed herein may be held together using a binder.

The heating layer is a nonwoven material. Preferably, the heating layer may be felt like (i.e., a nonwoven homogeneous flat structure). More preferably, the heating layer may be a nonwoven materials with a randomly oriented microstructure. The heater may be free of holes. The heater may include holes. The holes may be any shape so that heat is created and the adjoining surface, person, item, device, or a combination thereof is heated. The holes may be round, oval, square, cross-like, long and thin, symmetrical, asymmetrical, geometric, non-geometric, or a combination thereof. The heater may include side cutouts. Preferably, the heater may be free of side cutouts. The heater may be serpentine in shape. Preferably, the heater is not serpentine in shape. The microstructure of the heating layer may include a plurality of pores, a plurality of voids, or both. Voids and pores as discussed herein are part of the microstructure of the heating layer whereas through holes and cutouts are larger and are a space where, for example, material has been removed. The heating layer may have a sufficient amount of voids and/or pores so that air from an air mover can pass through the heating layer, the fibers of the heating layer are randomly oriented, power is randomly distributed throughout the heating layer, a protecting layer can penetrate through the heating layer, or a combination thereof. The voids and/or pores of the heating layer may represent an area of about 10 percent or more, about 15 percent or more, about 20 percent or more, about 25 percent or more, about 30 percent or more, or even about 40 percent or more of a total surface area of the heating layer. The voids and/or pores of the heating layer may represent an area of about 90 percent or less, about 80 percent or less, about 70 percent or less, about 60 percent or less, or about 50 percent or less of the total surface area of the heating layer. The heating layer may have a sufficient amount of fibers and/or material in the heating layer so that one or more other layers may be connected to the heating layer, a protecting layer can form a planar surface over the heating layer, or both.

The heater may include electrodes. The heater may be free of any additional electrically conducting layers (e.g., buses, electrodes, terminals, traces, spurs, braches, or a combination thereof). Preferably, the heater includes buses, electrodes, or both that extend substantially along a length and/or width of the heater and assist in applying power to the heater (e.g., power application portions). More preferably, the heating layer is free of terminals that connect the power source to the heater (i.e., a single point of power application). The heating layer may be free of gold, silver, copper, or a combination thereof. The heater may include positive temperature coefficient material (PTC). The heating layer may be free of any additional electrically conducting layers, positive temperature coefficient layers, additives, or a combination thereof that are added to the heating layer in a separate step, that assist in producing heat, producing a signal, or both. The heating layer may be free of a stabilizing material, a soft filling substance, an impregnated filling material, or a combination thereof. For example, the heating layer is free of a stabilizing material, a soft filing substance, an impregnated filling material, or a combination thereof that is added to the heater to assist in conducting power between the fibers. More preferably, the heating layer may be the only portion of the heater required to produce heat. For example, the heating layer may not be a substrate, the heating layer may be free of one or more materials disposed and/or printed on to form the heating layer, a material interwoven into the material, or a combination thereof. The configuration of the heating layer may be used to vary a resistivity, surface power density, or both of the heating layer.

A heating layer as discussed herein has a resistivity and a surface power density. The resistivity and the surface power density of the heating layer may be varied by varying the size and shape of the heating layer; varying the material construction of the forward cover layer, the rearward cover layer, or both; varying the amount of voltage applied to the heating layer; varying the amount of amperage applied to the heating layer; or a combination thereof. For example, the resistivity and surface power density of the heating layer may be varied by removing material from the heating layer (e.g., adding cutouts, through holes, slits, or a combination thereof. In another example, material may strategically be removed from the heating layer so that the resistivity of the heater is increased. The resistivity of the heating layer may be about 1.0Ω or more, preferably about 1.5Ω or more, or more preferably about 1.8Ω or more. The resistivity of the heating lay may be about 7Ω or less, about 5 Ω or less, about 3Ω or less, or about 2.5Ω or less (i.e., from about 1.5 Ω to about 2.3Ω). The resistivity may be directly proportional to the surface power density of the heating layer. Preferably, the resistivity is inversely proportional to the surface power density of the heating layer. Thus, as the resistivity is increased the surface power density is decreased.

The surface power density of the heating layer may be about 100 W/m² or more, about 200 W/m² or more, about 300 W/m² or more, or about 400 W/m² or more. The surface power density may be about 2000 W/m² or less, about 1500 W/m² or less, about 1000 W/m² or less, or about 750 W/m² or less (i.e., from about 600 W/m² to about 450 W/m²). One or more other factors discussed herein may impact the resistivity, the surface power density, or both such as basis weight, areal weight, or both of the heating layer.

The heating layer may be characterized by an areal weight (i.e., weight per unit areas of a fabric). The areal weight may be about 50 g/m² or more, about 60 g/m² or more, about 70 g/m² or more, preferably about 80 g/m² or more, more preferably about 90 g/m² or more, or most preferably about 100 g/m² or more. The areal weight may be about 500 g/m² or less, about 400 g/m² or less, preferably about 300 g/m² or less, or more preferably about 200 g/m² or less. The areal weight may be between about 50 g/m² and about 300 g/m², preferably between about 75 g/m² and about 250 g/m², and more preferably between about 100 g/m² and about 200 g/m².

One property that the fibers of the heating layer possess is a density. The density of the fibers may be about 0.5 g/cm³ or more, about 0.75 g/cm² or more, about 1.0 g/cm³ or more, or about 1.2 g/cm³ or more. The density of the fibers may be about 10 g/cm³ or less, about 5.0 g/cm³ or less, about 3.0 g/cm³ or less, or about 2.0 g/cm³ or less. The density of the fibers may be between about 0.5 g/cm³ to about 3.0 g/cm³, preferably between about 1.0 g/cm³ and about 2.0 g/cm³, and more preferably between about 1.1 g/cm³ and about 1.5 g/cm³.

The fibers of the heating layer may be characterized by a diameter. The diameter of the fibers may be about 0.0001 mm or more, preferably about 0.001 mm or more, preferably about 0.005 mm or more, or most preferably about 0.0065 or more. The diameter of the fibers may be about 1 mm or less, about 0.5 mm or less, about 0.1 mm or less, preferably about 0.05 mm or less more preferably about 0.02 mm or less, or most preferably about 0.008 or less (i.e., between about 0.007 and about 0.006 mm). The diameter of the fibers may be between about 0.0005 mm and about 0.1 mm, preferably between about 0.001 mm and about 0.05 mm, and more preferably between about 0.005 mm and about 0.02 mm.

The material of the heating layer possess a thickness. The thickness of the heating layer may be any thickness so that upon application of power the heating layer produces heat. The heating layer may be sufficiently thin so that the resistivity is from about 1 Ω to about 3 Ω and preferably from about 1.5 Ω to about 2.5 Ω and heating performance of the heating layer is improved when compared to heating layer lower than the heating layer taught herein. The thickness of the heating layer may be about 0.001 mm or more, about 0.005 mm or more, or preferably about 0.07 mm or more. The thickness of the heating layer may be about 30 mm or less, about 10 mm or less, preferably about 5 mm or less, more preferably about 2 mm or less, or more preferably about 1.0 mm or less. The thickness of the heating layer may be between about 0.001 mm and about 10 mm, preferably between about 0.005 mm and about 5 mm, and more preferably between about 0.07 mm and about 1 mm.

The material of the heating layer has a basis weight. The basis weight of the heating layer may be about 10 g/m² or more, about 30 g/m² or more, about 50 g/m² or more, or even about 70 g/m² or more. The material of the heating layer may have a basis weight of about 200 g/m² or less, about 150 g/m² or less, or about 100 g/m² or less.

The material of the heating layer may be characterized by a thermal conductivity. The thermal conductivity at 23° C. may be about 2.0 W/m*k or less, about 1.0 W/m*k or less, about 0.5 W/m*k or less, or about 0.005 W/m*k or less. The thermal conductivity at 23° C. may be about 0.001 W/m*k or more, about 0.005 W/m*k or more, or about 0.01 W/m*k or more. The thermal conductivity may be between about 1.0 W/m*k to about 0.001 W/m*k, preferably between about 0.5 W/m*k to about 0.005 W/m*k, and more preferably between about 0.01 W/m*k and about 0.075 W/m*k measured at 23° C. using ASTM STP 1426 or ASTM STP 1320. The thermal conductivity at 600° C. may be about 3.0 W/m*k or less, about 2.0 W/m*k or less, about 1.0 W/m*k or less, about 0.5 W/m*k or less, or about 0.01 W/m*k or less. The thermal conductivity at 600° C. may be about 0.001 W/m*k or more, about 0.005 W/m*k or more, about 0.01 W/m*k or more, or about 0.05 W/m*k or more. The thermal conductivity may be between about 1.5 W/m*k to about 0.001 W/m*k, preferably between about 0.7 W/m*k to about 0.007 W/m*k, and more preferably between about 0.1 W/m*k to about 0.01 W/m*k measured at 600° C. using ASTM STP 1426 or ASTM STP 1320.

The heating layer includes a specific heat. The specific heat at 23° C. may be about 0.001 W*sec/g*K or more, about 0.01 W*sec/g*K or more, preferably about 0.1 W*sec/g*K, or more preferably about 0.5 W*sec/g*K or more. The specific heat at 23° C. may be about 5.0 W*sec/g*K or less, about 2.0 W*sec/g*K or less, or about 1.0 W*sec/g*K or less. The specific heat may be between about 2.0 W*sec/g*K and about 0.001 W*sec/g*K, preferably between about 1.5 W*sec/g*K and about 0.01 W*sec/g*K, and more preferably between about 1.0 W*sec/g*K and about 0.1 W*sec/g*K measured at 23° C. using ASTM STP 1426 or ASTM STP 1320. The specific heat at 600° C. may be about 10 W*sec/g*K or less, about 5.0 W*sec/g*K or less, or about 3.0 W*sec/g*K or less. The specific heat at 800° C. may be about 0.1 W*sec/g*K or more, about 0.5 W*sec/g*K or more, about 1.0 W*sec/g*K or more, or about 1.5 W*sec/g*K or more. The heating layer may have a specific heat of between about 10.0 W*sec/g*K and about 0.01 W*sec/g*K, preferably between about 5 W*sec/g*K and about 0.1 W*sec/g*K, and more preferably between about 2.5 W*sec/g*K and about 0.75 W*sec/g*K measured at 600° C. using ASTM STP 1426 or ASTM STP 1320.

The heating layer includes a breaking tensile strength. The breaking tensile strength may be about 1 N/cm or more, about 1.5 N/cm or more, or preferably about 2 N/cm. The breaking tensile strength may be about 100 N/cm or less, about 80 N/cm or less, or about 60 N/cm or less. The heating breaking tensile strength of the heating layer may be from about 0.5 N/cm to 100 N/cm, preferably from about 1.0 N/cm to 80 N/cm, and more preferably from about 1.5 N/cm and 60 N/cm.

The material of the heating layer may have resistance to chemicals. Generally, the material of the heating layer may exhibit one or more of the following resistances to chemicals and/or material characteristics. The material of the heating layer may have good resistance to strong acids. The material of the heating layer may have excellent resistance to weak acids. The material of the heating layer may have poor resistance to strong bases. The material of the heating layer may have good resistance to weak bases. The material of the heating layer may have excellent chemical resistance to organic solvents. The material of the heating layer may exhibit a low modulus of elasticity (i.e., the material does not stretch), non-abrasive, non-hardening, self-lubricating, or a combination thereof.

The heating layer may be formed by mixing together one or more of the compositions discussed herein. The mixed composition may be extruded forming fibers, a sheet, a mat, a thread, or a combination thereof. The composition may be poured into a mold forming the heating layer. The heating may be formed by mixing together a plurality of fibers and forming a mat. The materials may form a first substance that may exhibit heating characteristics discussed herein. The materials may be subjected to a secondary treatment.

The heating layer may be attached to one or more terminals and upon application of electricity (e.g., power) the heating layer produces heat. The heating layer may be connected to one or more power application wires that apply power, a signal, or both. The power application wires may only apply power, only apply a signal or both. The power application wires may apply both power and a signal. The power application wires may be connected to a power source, a microprocessor, a processor, a computer, or a combination thereof. The heating layer may be connected to two or more, three or more, or even four or more terminals and/or power application wires that apply power and/or signals to the power application portions for providing heating and/or sensing using the heater/sensor. For example, the heating layer may include a positive and negative wire connected to each end of the heating layer so that a total of four wires are connected to the heating layer. The heating layer when connected to one or more positive power sources and one or more negative power sources (i.e., power application layers or power applications materials) may produce heat and/or may be used for sensing. Preferably, the heating layer is free of terminals that connect to buses and/or electrodes to the heating layer. For example, the buses and/or electrodes may be connected to the heating layer and the buses and/or electrodes may be connected to the power source. The terminal may directly and/or indirectly attach to the heating layer using any device so that electricity enters the heating layer through the terminals and the heating layer produces heat. The terminals may be crimped onto the heating layer. For example, the power applications may include terminals that connect a power source to the power applications. The terminals may be connected by sewing, bonding, a mechanical fastener, or a combination thereof to the heating layer, each power application layer, or both. Preferably, the heating layer may free of terminals directly attached to the heating layer (i.e., a single point of power application). The heater may be free of mechanical fasteners that attach a power source to the heater. For example, the heating layer may not have a mechanical attachment device that grips the heating layer and secures one or more wires to the heater. The heating layer may include two or more power applications that assist in supplying power to the heating layer.

The two or more power applications may be located at any location on the heater. Preferably, the two or more power applications are spaced apart. The two or more power applications may be spaced a sufficient distance apart so that the heater is partially and/or entirely energized upon an application of power. More preferably, the two or more power applications are located in an edge region of the heater. For example, one power application may be located along one edge of the heater and a second power application may be located along the opposing edge so that power travels though the heater as the power travels from the first edge to the second edge. The power application portion may extend along a lateral edge (e.g., width) or a longitudinal edge (e.g., a length) of the heater. The length of the power application wires may be inversely proportion to the conductivity of the heater/sensor. Thus, for example, the longer the wire the less conductive the heater/sensor. More specifically, a heater/sensor having longitudinal power applications may be made of only a carbon material. In another example, a power application portion that extends along a lateral side or edge may be connected to a heater that has metallized fibers that are more conductive than a heater made of carbon material. The heater may include more than two portion application portions. For example, the heater may include a power application portion substantially in a center of the heater and a portion application portion on each side of the center portion application portion so that power and/or signals travel from the center portion application portion to the edges or vice versa. The heater may include four or more power application portions. For example, the heater may include two opposing power application portions that extend from each edge and extend towards an opposing edge. The two opposing portion applications portions may terminate before the power applications portions connect such that a gap is located between the power application portions. The gap may electrically isolate the sides/edges of the heater/sensor. The sides/edges of the heater/sensor may be the same polarity so that the gap and/or isolator is not located between the sides/edges of the heater/sensor, so that the heater/sensor does not short, or both. Thus, each heater may include two or more, three or more, or even four or more power application portion for applying heat and/or power. The power application portions may be arranged on the heater/sensor so that opposing sides/edges of the power application portion include like polarities. For example, negative polarities, positive polarities, or both may be located on opposing edges so that when the heater/sensor is wrapped around a core the positive polarities or the negative polarities are in close proximity. In another example, the positive polarities are located on the sides/edges so that the sides/edges when wrapped are in a close relationship and the negative polarity is half located therebetween.

Each power application may include one or more parts for applying power, a signal or both. In one preferred example, each of the power applications consist of two discrete bus bars, electrodes, wires, or a combination thereof that are connected together and each of the two bus bars, electrodes, wires, or a combination thereof assist in supplying power to the heating layer. The power application portions may apply a signal, power or both. The heater/sensor may include two power application portions located proximate to each other and one power application portion may provide power and one power application portion may provide a signal. As discussed herein the power application portions may apply a signal, power, or both. However, discrete power application portions and associated wires may be used to apply only a signal or only power. The discrete power application portions for sensing may be directly connected to a microprocessor or processor for determining if a user is in contact with the heater/sensor. The bus bars, electrodes, wires, or a combination thereof may be made of the same material, different material, or a combination thereof.

Each of the bus bars and/or electrodes in a single power application, preferably, are made of two or more different materials. The power application may include one or more wires and preferably two or more wires that are interwoven together. The one or more wires may be needlepunched through the heater so that a power application is formed on one or both ends of the heater. The needlepunched wires may be connected to the heater and directly connect to a power source. The needlepunched wires may be made of a silver coated, copper coated, or both wire. The needlepunched wires may substantially be made of the same material as the heater; however, the needle punched wires may have a longer fiber length when compared to the fibers in the heater. The wires may be made of any conductive material that assists in transferring power to the heating layer so that heat is produced. Each wire may have a resistivity of about 5 $\Omega*m$ or less, about 2 $\Omega*m$ or less, or about 1 $\Omega*m$ or less. Each wire may have a resistivity of about 0.01 $\Omega*m$ or more, about 0.05 $\Omega*m$ or more, or about 0.01 $\Omega*m$ or more (i.e., about 0.25 $\Omega*m$). Each wire may have a weight of about 0.1 g/mm or less, about 0.01 g/mm or less, about 0.001 g/mm or less or about 0.0001 g/mm or less. Each wire may have a weight of about 0.00001 g/mm or more, preferably about 0.00005 g/mm or more, more preferably about 0.0001 g/mm or more, or most preferably about 0.0005 g/mm or more (i.e., about 0.0007 g/mm). Each of the wires in a preferred embodiment is a composite of a plurality of wires braided together to form a single wire. For example, the wire may be 20 silver wires each having a diameter of about 0.07 mm, and each of the 20 silver wires may be braided together to form a single wire. The wires are preferably made of copper, silver, gold, nickel, or a combination thereof and/or coated with copper, silver, gold, nickel, or a combination thereof so that power is transferred to the heating layer. The one or more wires may be connected to the heating layer by any device that fixedly connects the one or more wires to the heater and does not substantially interfere with the transfer of power to the heating layer. Some examples of attachment devices and/or methods that may be used are sewing, gluing (e.g., with conductive or non-conductive glue), bonding, interweaving, stapling, or a combination thereof. Preferably, an adhesive layer is used to connect the one or more wires to the heating layer. The adhesive layer that secures the one or more wires to the heating layer may also connect a second bus bar and/or electrode to the heating layer.

The power application may be made of any material that upon application of power assists in transferring the power to the heating layer so that the heating layer becomes hot. The power application may be made of any material so that upon applications of a sensor signal the heating layer senses a condition. The power application may include a bus bar and/or electrode that is located under the one or more wires, preferably over the one or more wires, or a combination of both. The power application may be free of a wire and may only be made of a nonwoven material as discussed herein. For example, a clip may be attached directly to the nonwoven material that provides an electrical connection to supply power to the heating layer. The bus bar and/or electrode may be a nonwoven material that has electrically conductive properties. The bus bar and/or electrode may be one or more conductive non-woven strips. The bus bar and/or electrode may be made of the same material as the heating layer. Preferably, the bus bars and/or electrode may be made of a carbon material, a polymeric material, a metallic coated material, or a combination of materials that form a conductive medium for carrying power to the heater. For example, the bus bars and/or electrodes may be a plurality of nylon fibers that are coated with nickel or silver and the coated nylon fibers may be bonded together in a binder and form a nonwoven material that conducts power to the heating layer. The bus bars and/or electrodes may be attached to the heating layer using any material and/or method as discussed herein for the one or more wires. Preferably, the bus bars and/or electrode, one or more heating wires, or a combination of both are connected to the heating layer using an adhesive fabric. More preferably, each power application includes two or more wires and a non-woven conductive material that are connected to the heating layer by an adhesive layer.

The adhesive layer may be any adhesive sheet that forms a connection upon an application of heat. The adhesive layer may be any adhesive layer discussed herein. The adhesive layer may a polyamide. The adhesive layer preferably is a non-woven material. The adhesive layer preferably is a plurality of fibers and/or fiber-like adhesive particles interconnected with voids and/or pores between the interconnected fibers and/or fiber-like adhesive particles. The adhesive layer may have a plurality of voids, a plurality of pores, or both. The adhesive layer may have a sufficient amount of voids and/or pores so that when the adhesive is connecting two or more electrically conducting layers (e.g., one or more layers of the power application, the heating layer, or both) power may pass through the voids and/or pores, an electrical connection may be maintained, the adhesive layer does not interfere with the supply of power between two or more electrically conducting layers, or a combination thereof, and a connection may be formed between the two or more layers. The voids and/or pores of the adhesive layer may represent an area of about 10 percent or more, about 20 percent or more, about 30 percent or more, preferably about 40 percent or more, or more preferably about 45 percent or more of a total surface area of the heating layer. The voids and/or pores of the adhesive layer may represent an area of about 90 percent or less, about 80 percent or less, about 70 percent or less, or about 60 percent or less of the total surface area of the heating layer. The adhesive may have a basis weight of about 5 g/m$^2$ or more, about 10 g/m$^2$ or more, or about 15 g/m$^2$ or more. The adhesive may have a basis weight of about 50 g/m or less, about 30 g/m$^2$ or less, or about 25 g/m$^2$ or less (i.e., about 19 g/m$^2$). The adhesive may have an initial melting temperature of about 85° C. or more, about 100° C. or more, or about 110° C. or more. The adhesive may have an initial melting temperature of about 200° C. or less, about 180° C. or less, or about 160° C. or less (i.e., about 150° C.). An example of an adhesive fabric that may be used is sold under the trade name Spunfab available from Spunfab Ltd.

The power application (i.e., the bus bar and/or electrode, the one or more wires, or a combination of both) may be made of any material that has a surface conductivity of about $1.0\times10^{-2}$ $\Omega$/sq or less, about $5.0\times10^{-2}$ $\Omega$/sq or less, preferably about $1.0\times10^{-3}$ $\Omega$/sq or less, more preferably about $5.0\times10^{-3}$ $\Omega$/sq or less, or most preferably about $1.0\times10^{-4}$ $\Omega$/sq or less. The power application (i.e., the bus bar and/or electrode, the one or more wires, or a combination of both) may be made of a material with a surface conductivity of about $1.0\times10^{-9}$ $\Omega$/sq or more, about $5.0\times10^{-8}$ $\Omega$/sq or more, or about $1.6\times10^{-8}$ $\Omega$/sq or more.

The heater may be comprised of only a heating layer (e.g., the heater may include one layer). Preferably, the heater includes at least three layers. However, the heater may be free of any layers that are secured over the heating layer. For example, the heater may include a layer that interpenetrates the heating layer and forms a partially and or fully protecting layer over the heating layer. The heating layer may incorporate partially and/or entirely a discrete material (i.e., a protecting layer) into the heating layer so that the heating layer is protected by the protecting layer. The protecting layer may be a reinforcing layer. For example, the protecting layer may reinforce the individual fibers so that the fibers are strengthened and the strength characteristics of the heater is increases (e.g., tensile strength, tearing strength, fold strength, the like, or a combination thereof). The protecting layer may be any material that becomes interwoven into the heating layer so that the protecting layer increases the strength of the heating layer (e.g., tensile strength, tearing strength, fold strength, the like, or a combination thereof), the insulation properties of the heating layer, or both. Preferably, the protecting layer increases the strength of the heating layer and forms a partially dielectric coating over the heater or a fully dielectric coating over the heater. The protecting layer may form an insulating layer over the forward surface, the rearward surface, the side edges, or a combination thereof of the heating layer so that the heating layer on the outside has dielectric characteristics, fluid resistance characteristics, or both. The protecting layer may form a layer on a forward side, a rearward side, a side edge, a top edge, a bottom edge, or a combination thereof so that the protecting layer is a dielectric layer over the heating layer. The protecting layer may fill the pores and/or voids between the individual fibers of the heating layer. Preferably, the protecting layer fills the pores and/or voids between the individual fibers of the heating layer, but does not entirely surround the individual fibers so that the connections and/or electrical connections between the fibers remain intact. The heater may include one or more attachment layers. The attachment layer may be a single sided adhesive layer. The attachment layer may be made of the same material as the adhesive discussed herein for attaching the power applications. The attachment layer may be an adhesive layer (e.g. a glue, paste, spray on adhesive, an adhesive film, a peel and stick, hook and loop, or the like). Preferably, the attachment layer may be a peel and stick film. The attachment layer may exhibit protection characteristics as discussed herein. The heater may be free of an attachment layer.

The heater and/or sensor as discussed herein may include one or more or even two or more heating layers that are placed side by side to heat and/or sense. For example, two substantially mirror image heater/sensors may be created and placed in a device side by side so that each heater may heat and each heater may sense. When more than one heater is used the total area of the single heater may be substantially the same as the total area of the multiple heaters. When more than one heater is used the multiple heaters may be used simultaneously, individually, in an alternating fashion, or a combination thereof. For example, when two heater/sensors are applied to a steering wheel one heater/sensor may heat and one sensor/heater may sense a condition such as a hand and then the heaters/sensors may alternate so that a presence of an occupant hand may be determined at substantially all times. In another example, when two or more heater/sensors are installed in a steering wheel each sensor may sense a half and/or quadrant of a steering wheel so that more than one hand may be sensed and the specific location of the hand may be sensed.

The heater as discussed herein may be produced using a process. The process may include one or more of the following steps produced in virtually any order. A plurality of the fibers discussed herein may be obtained. The fibers as discussed herein may be coated with metal, chopped to a desired length, refined so that the fibers are flatted, refined so that the fibers have an oval shape, or a combination thereof. The fibers may be mixed with, covered, with, moved into contact with, or a combination thereof any binder as discussed herein. The fibers may be arranged within a container so that the fibers have a random orientation. The fibers may be extruded with or without the binder forming a nonwoven sheet. The fibers may be assembled using hydroentanglement. The fibers may be sprayed with a binder, dipped in a binder, coated with a binder, or a combination thereof. Attaching one or more power applications to the heating layer. Attaching one or more wires, one or more non-woven conductive strips, one or more electrodes and/or bus bars, attaching one or more pre-assembled power applications, or a combination thereof. Heating the heating layer and the one or more wires, one or more non-woven conductive strips, one or more electrodes and/or bus bars, attaching one or more pre-assembled power applications, or a combination thereof so that an electrical connection is formed to the heating layer. Producing a pre-assembled power application by combining one or more wires, one or more non-woven conductive strips, one or more adhesive layers, one or more bus bars and/or electrodes, or a combination thereof together so that when placed on the heater and heated the adhesive connects the pre-assembled power application to the heating layer and an electrical connection is formed. Connecting the one or more power applications to a power source, a wire, or both. Applying a shrink tube to the one or more power applications, power sources, wires, or a combination thereof so that during a step of heating the shrink tube shrinks and the one or more power applications and power sources, wires, or both are electrically and physical connected. Applying a forward cover layer, a rearward cover layer, a connection layer (e.g., adhesive layer, mechanical attachment layer, or both), or a combination thereof to the heating layer. Cutting the heating layer so that the heating layer includes through holes, cutouts, or both. Applying a fire retardant material, a flame resistant material, a water resistant material, a dielectric layer, or a combination thereof to the heating layer. Attaching a temperature sensor to the heating layer, the heater, or both. Electrically connecting the temperature sensor to a power source. Connecting (e.g., physically and/or electrically) the heating layer to a controller, a control module, or both. Connecting the heater to a vehicle seat, a floor, a steering wheel, a mirror, an insert, or a combination thereof.

As discussed herein the heater may be integrated into another component during the construction of the component so that the heater and the component form one unitary piece. For example, if the article is a molded part the heating medium, which forms the heating layer, may be added into the mold so that when a final article is created the heater layer is throughout the article and the entire article heats when electricity is added. The heating medium may be individual fibers. The heating medium may be a sheet. The heating medium may be sprinkled into the mold, cut and placed in the mold as a sheet, mixed into the molding material and both materials added to a mold together, or a combination thereof.

The heater a discussed herein may be controlled using any method discussed herein. Preferably, the heater include a thermistor or a negative coefficient temperature sensor that measures the temperature of the heater and based upon the measured temperature a controller controls the temperature of the heater, the ventilation system, the conditioning system, or both. The heater, the conditioning system, the ventilation system, or both may be controlled using pulse width modulation.

The heater may include a sensor. Preferably, the heater may be a sensor. The sensing portion of the heater may be used simultaneously with heating, between a heating cycle, during a heating cycle, or a combination thereof. Preferably, a heating cycle and a sensing cycle may alternate. The sensor may detect the presence of an occupant, contact from an occupant with a component, mass of an occupant, any other sensing function discussed herein, or a combination thereof. The sensing portion of the heater may include only the heater (i.e., a power application portion, one or more power connections, a continuous heating layer). The sensing portion may function when a signal is passed into the heater through the one or more bus bars.

The signal may be any signal that detects an occupant, contact from an occupant, the presence of an occupant, or a combination thereof. The signal may be an analog signal, a digital signal, or a combination of both. The signal has a frequency and the frequency of the signal may be a predetermined frequency. The frequency of the signal may be constant as the signal passes through the heater. The frequency of the signal may shift when an occupant contacts a component that includes the heater, an occupant is in close proximity to the component and/or heater, or both. The change in frequency may be any frequency shift (e.g., millihertz, microseconds, the like, or a combination thereof) that is sufficient enough to be caused by an occupant. For example, placing a bag on a seat may not cause a sufficient frequency shift (if any) to trigger the sensor to send a signal when compared to the frequency shift by an occupant. The frequency shift may be any frequency shift associated with a change in capacitance. The capacitance may be one or more capacitances and preferably a plurality of capacitances. The capacitance may be a measured capacitance, a calculated capacitance, or both. The capacitance may be an average capacitance. The capacitance may be a plurality of averaged measured capacitances, a plurality of calculated capacitances, or both. The average capacitance may be an average of about 3 or more, 5 or more, or about 10 or more calculated capacitances, measured capacitances, or both. The measured capacitance, the calculated capacitance, or both of the system of about 50 pF or more, about 75 pF or more, or about 100 pF or more. The measured capacitance, the calculated capacitance, or both of the system of about 500 pF or less, about 400 pF or less, about 300 pF or less, or about 200 pF or less. Preferably, the frequency shift is associated with a change in capacitance, a measured capacitance, a calculated capacitance, or a combination thereof of between about 100 pF and about 200 pF. For example, a signal with a frequency may enter the heater and the signal may be measured as it exits the heater, when an occupant is in contact with the heater, the frequency of the signal may shift so that the frequency of the signal as it exits is delayed when compared to a signal when the occupant is not in contact with the heater. In another example, the capacitance of the system may be measured and the capacitance of the system may be set as a baseline so that the system without an occupant measures 0 pF and when an occupant contacts the heater and/or sensor the capacitance of the system as measured and/or calculated is about 100 pF.

The capacitance of the system may be calculated using an RC series circuit formula. The capacitance of the system may be calculated with the following formula: $\tau = RC$, where R is the resistance of a reference resistor, C is the capacitance of the capacitor being monitored, and $\tau$ is a time constant. The time constant ($\tau$) during discharge may be the amount of time the voltage takes to drop about 36.8 percent of the voltage applied across the circuit. The reference resistor has a known value so that upon determining the time constant the capacitance may be calculated to determine the capacitance of the system. The capacitance may be discharged to about 36.8 percent after $\tau$, and essentially fully discharged (0.7 percent) after about $5\tau$. Alternatively, the time constant (T) during charging may be about the amount of time the voltage takes to reach about 63.2 percent of the voltage applied across the circuit. The capacitance may be essentially fully charged (99.3 percent) after about $5\tau$. The signal may be continuously monitored, intermittently monitored, or both. The capacitance of the system may be measured and/or calculated using the RC series circuit formula discussed herein, using a capacitive voltage divider technique, or both.

The capacitive voltage divider technique may function to split a voltage into a measured voltage and a reference voltage. The reference voltage may be compared to the measured voltage to determine the capacitance of the system. One example of a voltage divider technique that may be used with the teachings herein is described in an article titled "mTouch™ Sensing Solution Acquisition Methods Capacitive Voltage Divider," written by Burke Davison, of Microchip, listed as DS01478B, pages 1-25, the teachings of which are expressly incorporated by reference herein in their entirety for all purposes. The capacitive voltage divider technique may be used instead of or in addition to the RC series circuit formula to measure a capacitance of a heater/sensor.

The step of monitoring may compare a signal, a frequency of a signal, a capacitance of a signal, a voltage, a time constant, or a combination thereof (hereinafter measured signal) to a look-up table to determine the presence of an occupant, contact of an occupant, or both. The measured signal may be filtered through a resistor before the measured signal reaches the signal controller. The resistor may function to assist the system in determining the presence of an occupant, contact of the occupant, or both. The resistor may function to protect a measurement node of the system, protect a microprocessor, or both. The measured signal may be compared to a look-up table to determine the status of the occupant. The measured signal may determine if an occupant is present, if an occupant is in contact with a component, or both. The measured signal may be constant when an occupant is in contact with a component including the heater, and a change in the measured signal outside of a predetermined measured signal (e.g., an occupant is not in contact with the heater for a predetermined amount of time) may result in a predetermined response. A predetermined response may occur after a measured signal outside of a predetermined measured signal is present for about 1 second or more, about 2 seconds or more, about 3 seconds or more, or about 5 seconds or more. The predetermined response may occur after a measured signal outside of a predetermined signal is present for about 30 seconds or less, preferably about 20 seconds or less, more preferably about 10 seconds or less. For example, if driver takes hands off steering wheel then car will not take over until had done for a longer duration. The heating function may include one controller to provide power to the heater so that the heater produces heat and the sensing function may a separate controller to provide sensing, or the heating function and the sensing function may be operated by the same controller.

Power, current, voltage, or a combination thereof may be constantly applied, intermittently applied, varied, or a combination thereof so that the heater produces heat. Preferably, the controller may regulate the control of the heater, the temperature of the heater, or both using pulse width modulation (PWM). Depending on the desired temperature of the heater the PWM signal providing power may be lengthened or shortened. Thus, power is either being applied or not applied (i.e., on or off) and the duration of applying power is adjusted. For example, when the heater is on medium the PWM may provide a signal between about 60 percent and about 80 percent, thus, the heater is off between about 40 percent and 20 percent of the time. The sensing signal may interrupt the heating signal and/or heating voltage so that heating is temporarily stopped while one or more and preferably a plurality of measurement signals are taken. For example, heating may be interrupted for about 500 ms so that one or a plurality of signals may be taken, and the process may be repeated intermittently so that an occupant may be detected. The sensor may provide sensing functions when the heater is off and/or power is not being applied to heat the heater.

A signal may be provided to the heater at any time so that the heater may be used for sensing. Preferably, a signal is applied to the heater when power is not being applied (i.e., the heater is "off.") During application of the sensing signal one or more transistors may disconnect the heater from the power source, disconnect the heater from a ground, or both. During application of the sensing signal the power controller, heating capabilities or both may be disconnected. The signal may be any signal with a frequency. The signal may be any signal where the signal shifts upon a change in capacitance.

The teachings herein provide a method of heating and sensing. The method includes one or more of the steps discussed herein in virtually any order. Power may be applied to the heater so that the heater produces heat A signal may be applied to the heater so that the heater is a sensor. Power, a signal, or both may be applied alternatingly or simultaneously. The power may be intermittently turned off so that a sensing signal may be applied. A controller may measure the shift in capacitance of the system, a shift in the frequency of a measured signal, or both. One or more transistors may turn on and/or off the heating portion of a circuit (e.g., a ground, a power source, or both).

FIG. 1 illustrates an infrared image of a steering wheel 2 when the heater 10 and sensor 20 are turned on. The heater 10/sensor 20 include power application portions 12 at each end and the power application portions are connected to power wires so that the heater 10/sensor 20 provide heat and sensing capabilities. As shown, the heat of the heater 10 is even around the steering wheel 2.

FIG. 2 illustrates the heater 10/sensor 20. Power applications 12 are located at both ends so that when power is applied the heater 10 heats and the sensor 20 senses.

FIG. 3A illustrates a close up view of the power application 12 of FIG. 2. The power application 12 includes a power application wire 14 and the power application wire 14 is covered by a power application material 16 that is connected via an adhesive (not shown).

FIG. 3B illustrates a close up view of a power application 12 including power application wires 14 that are needlepunched into the heater 10/sensor 20 forming an electrode for supplying power and/or a signal.

Figure 4:
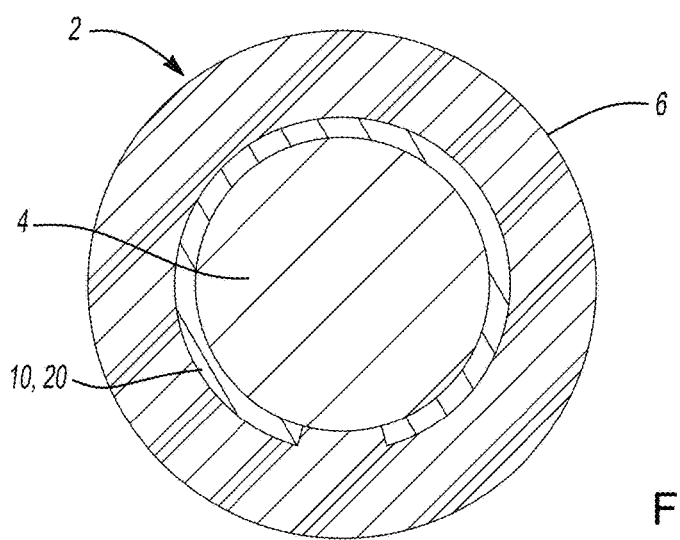
FIG. 4 illustrates a cross-sectional view of a steering wheel.

FIG. 4 illustrates a cross-section of a steering wheel 2. The steering wheel 2 includes a core 4. The heater 10/sensor 20 wraps around the core 4. The heater 10/sensor 20 is covered by a trim layer 6.

Figure 5A:
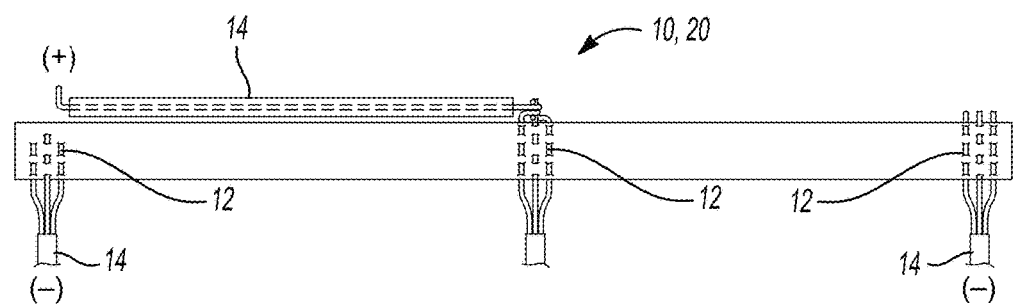
FIG. 5A illustrates an example of a heater/sensor including one central power application portion with a power application portion on each side.

FIG. 5A illustrates a heater/sensor 10, 20 with three power application portions 12. As illustrated, the middle power application portion 12 is a positive power application portion with a negative power application portion 12 on either. The middle power application portion 12 may be located at virtually any location between the two power application portions 12 although substantially centered is preferred. A positive power application wire 14 extends into contact with the center power application portion 12 while each of the end power application portions 12 are connected to a separate negative power application wire 14.

Figure 5B:
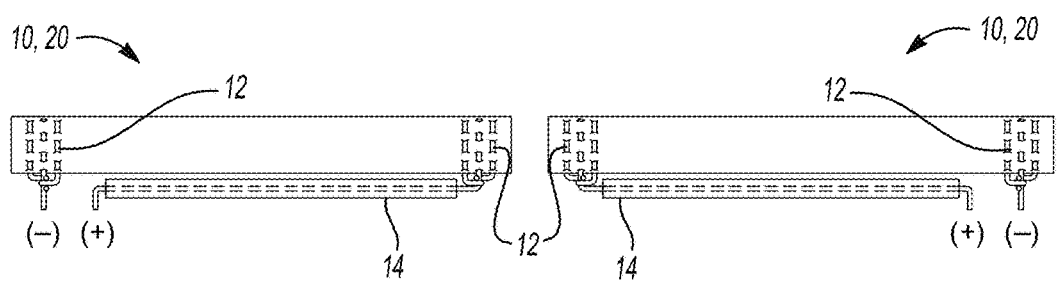
FIG. 5B illustrates a heater/sensor with multiple portions each including discrete portion application portions.

FIG. 5B illustrates two discrete heater/sensors 10, 20 that when combined form a heater/sensor. Each of the discrete heater/sensors 10, 20 includes a positive power application portion 12 and a negative power application portion 12 that are each connected to a discrete power application wire 14. As illustrated, the positive power application portions 12 are located proximate to each other and the negative power application portions 12 are located on the outside of the heater/sensors 10, 20. As illustrated, the sensor 20 when in sensing mode can sensor if one or more hands of an occupant are in contact with, for example, a steering wheel, as each sensor 20 will be able to individually sense an occupants hand (not shown).

Figure 5C:
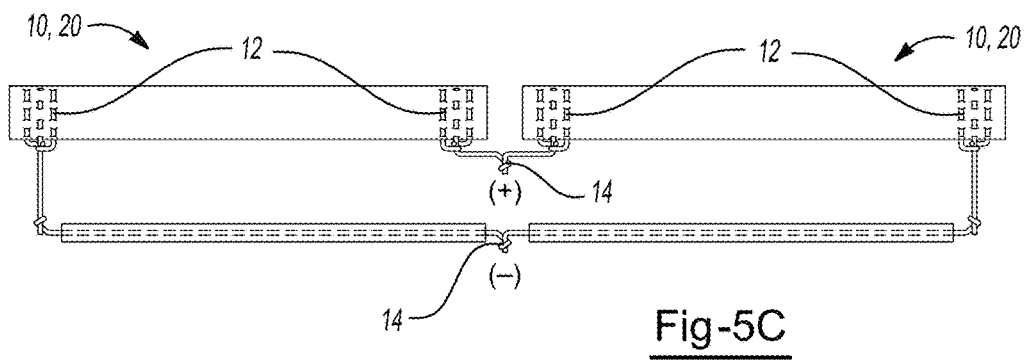
FIG. 5C illustrates a heater/sensor with multiple portions having power application portions electrically connected.

FIG. 5C illustrates two discrete heater/sensors 10, 20 that are electrically connected together via common positive power application wires 14 and negative power application wires 14. As illustrated, the negative power application wires 14 connect to outside ends of the heater/sensors 10, 20 and the positive power application and located proximate to each other in ends of the heater/sensor 10, 20 opposite the negative power application portions 12. As illustrated, each sensor 20 can determine contact with an occupant individually so that the sensor can determine if one or occupant body parts are in contact with the sensor 20 during a sensing phase.

Figure 6A:
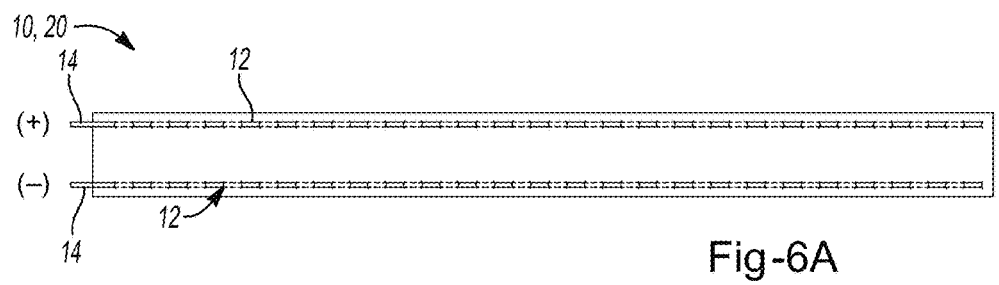
FIG. 6A illustrates a heater/sensor including longitudinal power application portions.

FIG. 6A illustrates a heater/sensor 10, 20 with longitudinal power application portions 12 that extend the length of the heater/sensor 10, 20. The longitudinal power application portions 12 extend substantially parallel along opposite edges of the heater/sensor 10, 20 with heater/sensor material extending therebetween and electrically connecting the two opposing power application portions 12.

Figure 6B:
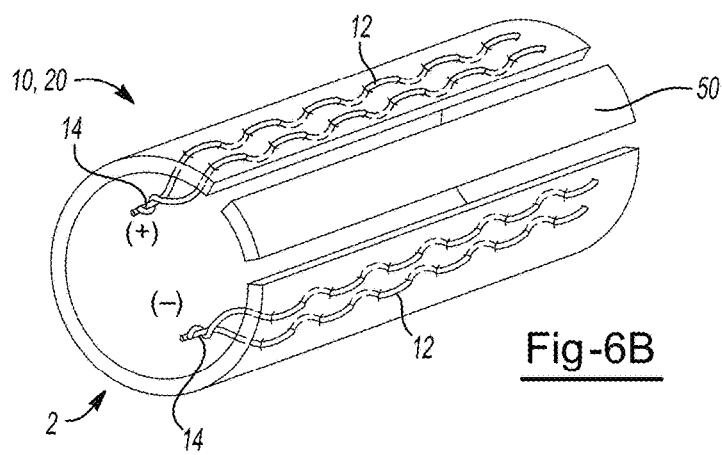
FIG. 6B illustrates the heater/sensor of FIG. 6A disposed about a steering wheel.

FIG. 6B illustrates the heater/sensor 10, 20 of FIG. 6A connected to a steering wheel 2. The heater/sensor 10, 20 includes power application portions 12 that are wrapped around a core 4 (not shown) so that the power application portions 12 are located substantially proximate to each other with power application wires 14 extending from each of the power application portions 12. As illustrated, an insulating layer 50 is located between the two power application portions 12 and electrically isolates the power application portions 12 from each other except through the material of the heater/sensor 10, 20 so that power must travel from one power application portion 12 through the material, generating heat, to the second power application portion 12.

Figure 7:
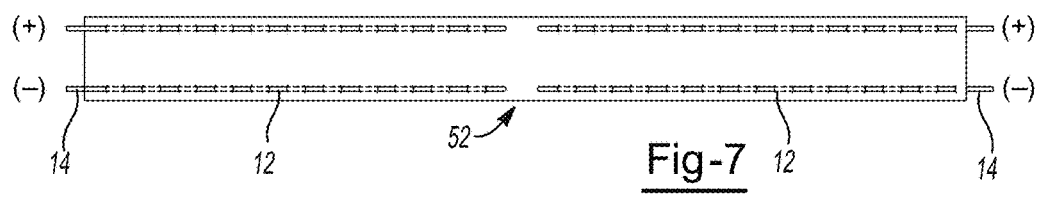
FIG. 7 illustrates heater/sensor including multiple discrete power application portions extending along the length of the heater/sensor for providing power.

FIG. 7 illustrates a heater/sensor 10, 20 having power application wires 14 connecting to each end of the heater/sensor 10, 20 so that a longitudinal power application portion 12 extends along the length of the heater/sensor 10, 20. The power application portions 12 extend longitudinally from each end and terminate before the power application portions 12 come into contact so that a small gap 52 is located between each end of the power application portions 12, and each of the positive power application portions 12 are electrically isolated and each of the negative power application portions 12 are electrically isolated. The negative power application portions 12 and the positive power application portions 12 are electrically connected though the heater/sensor 10, 20.

Figure 8A:
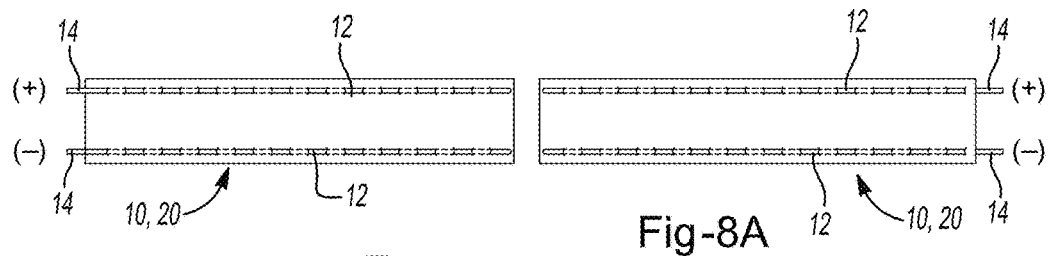
FIG. 8A illustrates two discrete heater/sensors each including longitudinal power application portions.

FIG. 8A illustrates two discrete heater/sensors 10, 20 that each include a positive and negative power application portion 12 that are each connected to a power application wire 14. Each heater/sensor 10, 20 heats individually and senses individually by passing power and/or signals from one power application portion 12 through the heater material and to the opposing power application portion 12. Each sensor 20 can individually sense a condition so that more than one conditions such as two hands can be sensed simultaneously.

Figure 8B:
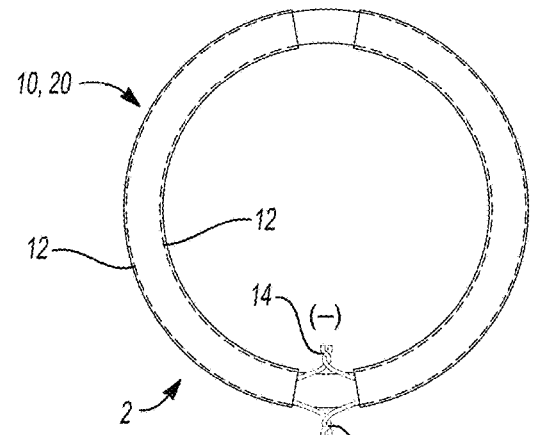
FIG. 8B illustrates the two discrete heater/sensors of FIG. 8A disposed on a steering wheel.

FIG. 8B illustrates the two discrete heater/sensors 10, 20 of FIG. 8A wrapped around a steering wheel 2 and the power application wires 14 connected together so that power and/or signals are distributed between the heater/sensors 10, 20.

Figure 9A:
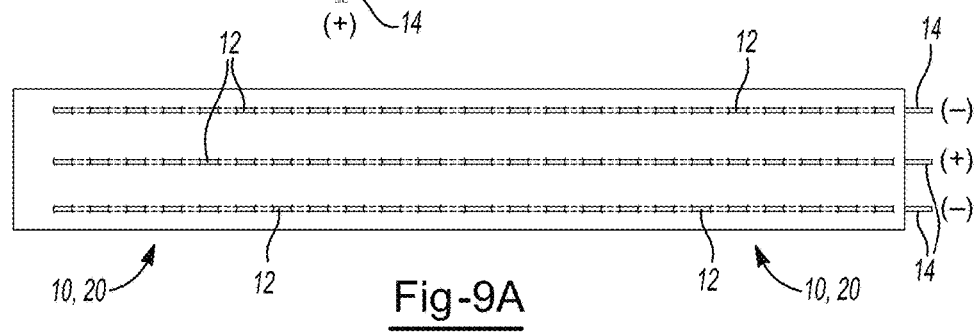
FIG. 9A illustrates a heater/sensor including multiple discrete power application portions extending along the length of the heater/sensor for providing power.

FIG. 9A illustrates a heater/sensor 10, 20 that includes three longitudinal power application portions 12. The two outside power application portions 12 as illustrates are negative and the middle power application portion 12 is positive. Each of the power application portions are connected to a power application wire 14 so that power and sensing signals are applied through the heater/sensor 10, 20.

Figure 9B:
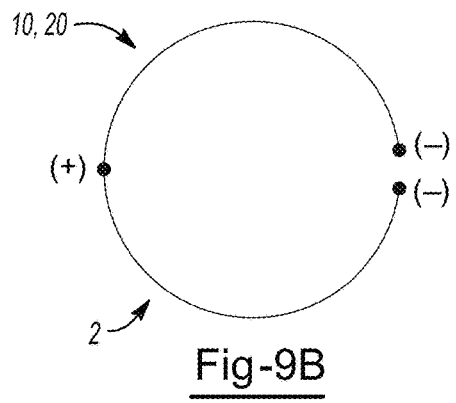
FIG. 9B illustrates an example of an electrical configuration for the heater/sensor.

FIG. 9B illustrates a cross-sectional view of the heater/sensor 10, 20 when the heater/sensor is wrapped around a steering wheel 2. As illustrated, the two negative ends of the heater/sensor 10, 20 are placed in close proximity and even in contact without the heater/sensor 10, 20 shorting.

Figure 9C:
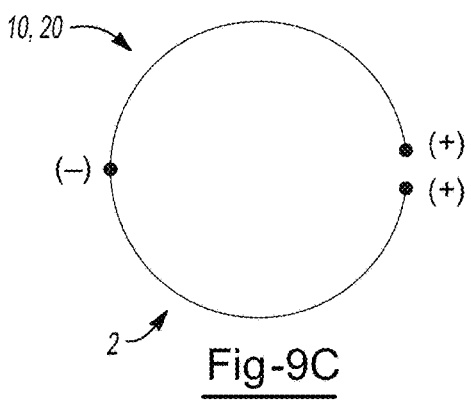
FIG. 9C illustrates another example of an electrical configuration.

FIG. 9C illustrates a cross-sectional view of another heater/sensor 10, 20 when the heater/sensor 10, 20 is wrapped around a steering wheel 2. As illustrated, the two positive ends of the heater/sensor 10, 20 are placed in close proximity and even in contact without the heater/sensor 10, 20 shorting.

Figure 9D:
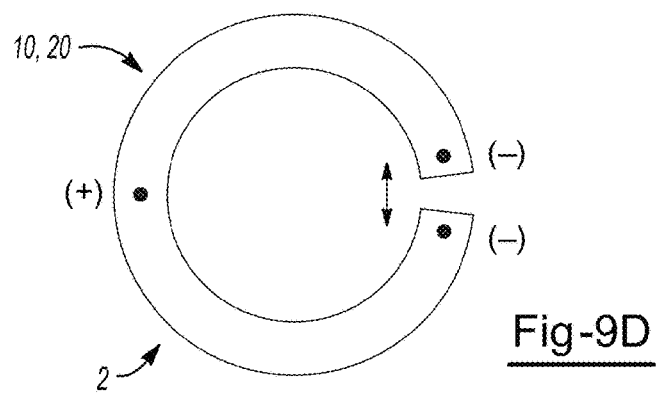
FIG. 9D illustrates an example of a heater/sensor with ends of the heater/sensor located proximate without a gap between the ends.

FIG. 9D illustrates the heater/sensor 10, 20 being wrapped around a steering wheel 2 and the ends moved into contact so that a gap is does not exist between the ends of the heater/sensor 10, 20.

Figure 10:
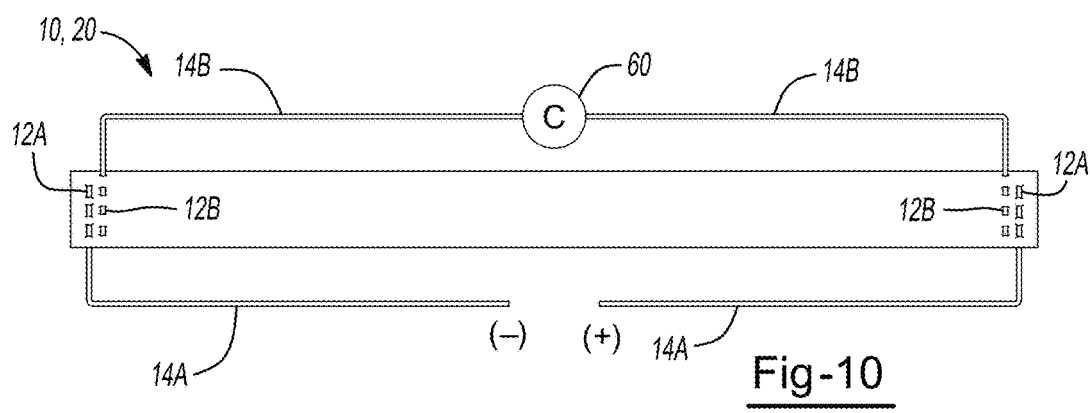
FIG. 10 illustrates an example of a heater/sensor with a discrete power application portion for applying power and a discrete power application portion for applying a signal.

FIG. 10 illustrates a heater/sensor 10, 20 including a portion application portion for applying power 12A at each end and a power application portion for applying a signal 128 at each end. Each of the power application portions for applying power 12A is connected to a power application wire 14A so that power is applied to the heater/sensor 10, 20 to produce heat. Each of the power application portions for applying a signal 148 are connected to power application wire 148 so that a signal is applied to the heater/sensor 10, 20 when the heat is off to sense occupant contact. The power application wires 148 are connected to a microprocessor 60 that senses occupant contact.

Figure 11:
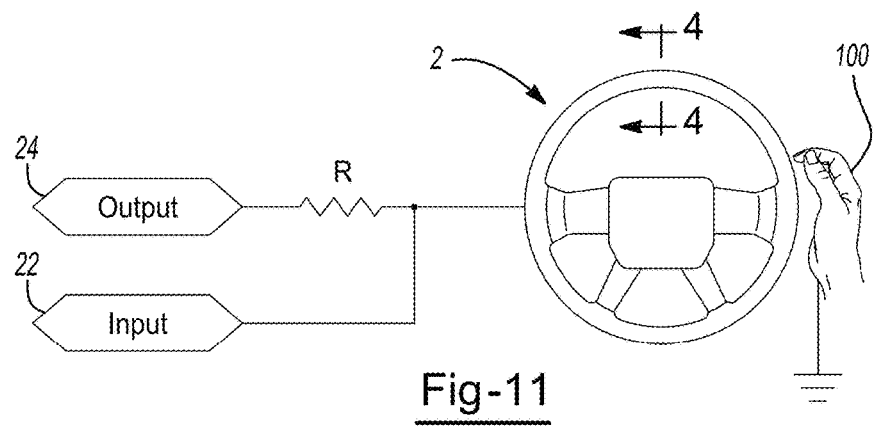
FIG. 11 illustrates a sensing circuit of the teachings herein.

FIG. 11 illustrates a circuit diagram during sensing. A signal in provided through the input 22 which goes into the heater (not shown) in the steering wheel 2. The signal then returns and extends through a resistor 26 to an output 24 where the signal is compared to a look up table. As illustrated, the steering wheel 2 forms one side of a capacitor 40 and the occupant 100 forms the other side of a capacitor 40 so that when the occupant 100 is in contact with the steering wheel 2 a frequency shift is sensed through the output 24.

Figure 12:
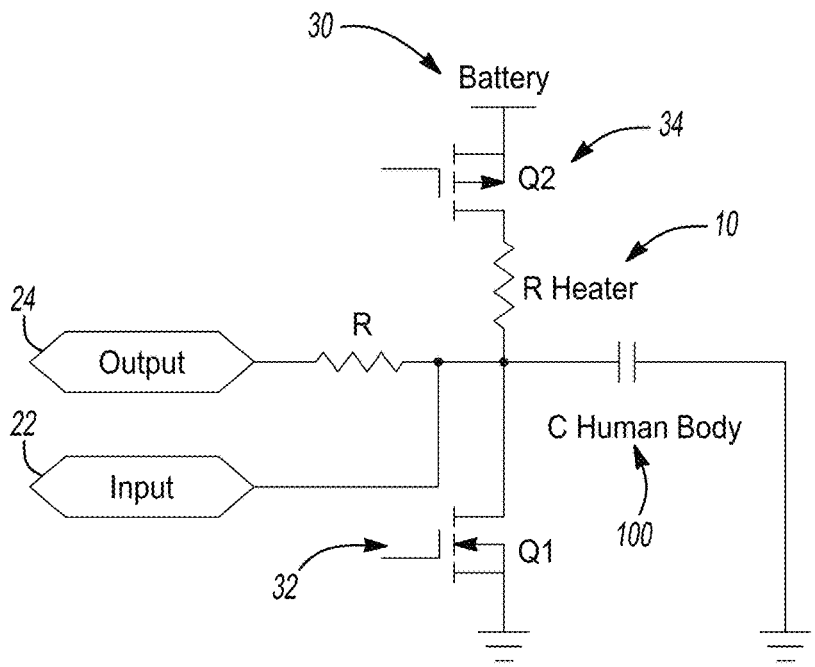
FIG. 12 illustrates an example of a combination heating circuit and sensing circuit.

FIG. 12 illustrates a circuit diagram including both heating and sensing. When the heater 10 is being operated, power is applied from a power source 30 through a second transistor 34 into the heater 10. During sensing a signal is sent from the input 22 to the heater 20, and the transistor one 32 and transistor two 34 are turned off so that the signal passes through the resistor 26 and the output 24.

Figure 13:
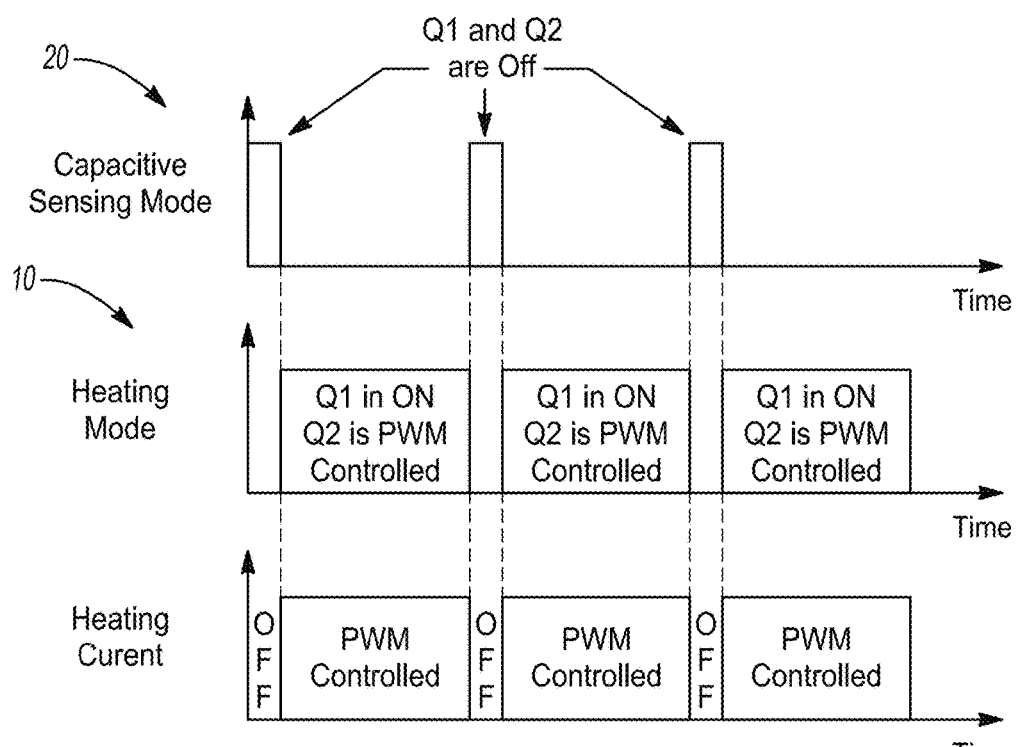
FIG. 13 illustrates an example of signals and power being applied to a heater.

FIG. 13 illustrates one example of operation of the heater 10 and the sensor 20. The heater 10 is powered via pulse width modulation so that power is applied for a given time and then power is turned off for a given time. During the time when the heater is turned off a signal is applied to the heater so that the heater is used for sensing.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A device comprising:
   a) at least one of a heating layer including a heater and a sensing layer including a sensor;
   b) a power connection portion configured to receive power provided to the device and a portion configured to sense contact with the device, wherein at least one of the power connection portion and the sensing portion is connected to at least one of the heating layer and the sensing layer;

c) a first transistor located between (i) at least one of the heating layer and the sensing layer and (ii) a ground, the first transistor having an on state and an off state;
d) a second transistor located between (i) a power source and (ii) at least one of the heating layer and the sensing layer, the second transistor having an on state and an off state;
wherein the heating layer and the sensing layer are located within a same plane; and
wherein, when in the on state, the first transistor and the second transistor allow power to pass through the heating layer to turn on the heater and, when in the off state, the first transistor and the second transistor prevent power from passing through the heating layer and the sensing layer from the power source so that a signal is passed through the sensing layer to detect a presence of an occupant;
a first resistor having a first end connected between the first transistor and the second transistor and a second end connected to an output; and
a sensing controller configured to provide the signal when the first transistor and the second transistor are in the off state, wherein the sensing controller provides the signal through the first resistor from the first end to the output such that the signal does not pass through the heater.

2. The device of claim 1, wherein the sensing layer is a sensing wire that is sewn into the heating layer to provide sensing functions.

3. The device of claim 1, wherein the heating layer and the sensing layer are a same device.

4. The device of claim 3, wherein the heater does not include separate parts forming a sensor.

5. The device of claim 1, wherein the heater is controlled using pulse width modulation and, when the first transistor and the second transistor are in the off state and the heater is off, the signal passes through the sensing layer to provide sensing.

6. The device of claim 3, wherein (i) the power connection portion includes a conductive nonwoven fabric that is fastened to at least one of the heating layer and the sensing layer and (ii) the power connection portion includes two portions that are located on opposite edge regions of the heater.

7. The device of claim 3, wherein a heater controller is connected to the heater to energize the heater so that the heater provides heat and the sensing controller is connected to the sensor to provide the signal so that the sensor provides sensing, and wherein the sensing controller and the heater controller are connected to the heater and the sensor, respectively, via one or more wires and the one or more wires both energize the heater and provide the signal to the sensor.

8. The device of claim 1, wherein the heater and sensor are located within a steering wheel and covered by a trim layer.

9. The device of claim 1, wherein the heater and the sensor and located within a vehicle seat and are covered by a trim layer.

10. The device of claim 1, wherein the sensor determines at least one of occupant contact and presence of an occupant.

11. A method comprising:
a) installing a combination heater and sensor into a component of an automobile;
b) providing power to the combination heater and sensor so that a heating layer of the combination heater and sensor produces heat;
c) providing Rap an input signal to the combination heater and sensor through a resistor so that a sensing layer of the combination heater and sensor produces an output signal for determining at least one of presence of an occupant and contact between the occupant and the component of the automobile;
d) monitoring the output signal for at least one of an occupant, lack of an occupant, and lack of contact between the component and the occupant;
e) turning a first transistor and a second transistor off during step (c); and
f) turning the first transistor and the second transistor on during step (b),
wherein the resistor has a first end connected between the first transistor and the second transistor and a second end connect to an output, wherein the input signal is provided to the first end of the resistor such that the signal does not pass through the heater, and wherein the output signal is generated at the output.

12. The method of claim 11, wherein the power is applied by pulse width modulation so that the power has an on phase and an off phase.

13. The method of claim 11, wherein the input signal is applied to the combination heater and sensor when the power is in the off phase.

14. The device of claim 1, wherein at least one of the heating layer and the sensing layer includes multiple portions that are electrically isolated or electrically connected together.

15. The device of claim 1, further comprising a second resistor located between the second transistor and at least one of the heating layer and the sensing layer.

16. The method of claim 11, wherein at least one of the heating layer and the sensing layer is located in a steering wheel and includes multiple portions, and wherein the method includes a step of sensing a specific location of a hand on at least one of the heating layer and the sensing layer.

17. The method of claim 11, wherein the power is turned off when the input signal is being applied and the input signal is turned off when the power is being applied.

* * * * *